United States Patent
Briant et al.

(10) Patent No.: US 9,328,865 B2
(45) Date of Patent: May 3, 2016

(54) HOLDER WITH HANDLE FOR MOBILE COMPUTING DEVICE

(71) Applicants: Wyatt R. Briant, Washington, PA (US); David E. Conely, Pittsburgh, PA (US)

(72) Inventors: Wyatt R. Briant, Washington, PA (US); David E. Conely, Pittsburgh, PA (US)

(*) Notice: Subject to any disclaimer, the term of this patent is extended or adjusted under 35 U.S.C. 154(b) by 0 days.

(21) Appl. No.: 14/109,690

(22) Filed: Dec. 17, 2013

(65) Prior Publication Data

US 2014/0166832 A1 Jun. 19, 2014

Related U.S. Application Data

(60) Provisional application No. 61/738,575, filed on Dec. 18, 2012.

(51) Int. Cl.
| | |
|---|---|
| *A47B 96/06* | (2006.01) |
| *F16M 13/04* | (2006.01) |
| *F16M 11/04* | (2006.01) |
| *F16M 11/06* | (2006.01) |
| *F16M 11/22* | (2006.01) |

(52) U.S. Cl.
CPC ............ *F16M 13/04* (2013.01); *F16M 11/041* (2013.01); *F16M 11/06* (2013.01); *F16M 11/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,469,325 | B2 * | 6/2013 | Yu ............................. | 248/316.1 |
| 8,649,166 | B2 * | 2/2014 | Wu et al. .................. | 361/679.27 |
| 8,905,367 | B2 * | 12/2014 | Bury ......................... | 248/316.4 |
| 2006/0050471 | A1 * | 3/2006 | Chen .......................... | 361/681 |
| 2007/0076362 | A1 * | 4/2007 | Lagnado ..................... | 361/683 |
| 2007/0284500 | A1 * | 12/2007 | Fan ........................ | 248/346.06 |
| 2009/0050658 | A1 * | 2/2009 | Boyd et al. ................. | 224/245 |
| 2012/0025684 | A1 * | 2/2012 | Trotsky ..................... | 312/334.1 |
| 2012/0080577 | A1 | 4/2012 | McIntyre et al. | |
| 2012/0091307 | A1 | 4/2012 | Haynes | |
| 2012/0097831 | A1 | 4/2012 | Olukotun et al. | |
| 2012/0175474 | A1 | 7/2012 | Barnard et al. | |
| 2012/0227637 | A1 * | 9/2012 | Meadows et al. .............. | 108/28 |
| 2012/0312936 | A1 * | 12/2012 | Huang ....................... | 248/122.1 |
| 2012/0326003 | A1 * | 12/2012 | Solow et al. ................. | 248/688 |
| 2013/0134284 | A1 * | 5/2013 | Hu et al. ..................... | 248/451 |
| 2013/0206942 | A1 * | 8/2013 | Trotsky ..................... | 248/274.1 |
| 2014/0042285 | A1 * | 2/2014 | Carnevali .................. | 248/316.4 |
| 2014/0097306 | A1 * | 4/2014 | Hale et al. ................. | 248/122.1 |

* cited by examiner

*Primary Examiner* — Monica Millner
(74) *Attorney, Agent, or Firm* — Knobbe, Martens, Olson & Bear, LLP

(57) ABSTRACT

A holder for a mobile computing device, such as a tablet computer or the like, can include a handle that is positioned laterally from a device space in which the mobile computing device is held within the holder. The handle can be angled relative to the mobile computing device and can have a fixed angle or adjustable angles. The holder can include two or more portions that are connectable in two or more different positions to hold the mobile computing device in at least two orientations, such as landscape and portrait orientations, and/or to accommodate devices of different sizes. In some configurations, the holder can incorporate a peripheral device.

14 Claims, 20 Drawing Sheets

HOLDER WITH HANDLE FOR MOBILE COMPUTING DEVICE

INCORPORATION BY REFERENCE TO RELATED APPLICATIONS

Any and all applications identified in a priority claim in the Application Data Sheet, or any correction thereto, are hereby incorporated by reference herein and made a part of the present disclosure.

BACKGROUND OF THE INVENTION

1. Field of the Invention

The present disclosure relates to holders or cases for mobile computing devices, such as tablet computers, smart phones or the like.

2. Description of the Related Art

Many types of protective holders or cases exist for mobile computing devices, such as tablet computers or the like. However, existing holders and cases have one or more disadvantages including, for example, being difficult or time-consuming to attach to or remove from the device. Moreover, a need exists for new holders or cases that improve user interaction with the device and/or the holder or case.

SUMMARY OF THE INVENTION

The systems, methods and devices described herein have innovative aspects, no single one of which is indispensable or solely responsible for their desirable attributes. Without limiting the scope of the claims, some of the advantageous features will now be summarized.

A holder for a mobile computing device, such as a tablet computer or the like, can include a handle that is positioned laterally from a device space in which the mobile computing device is held within the holder. The handle can be angled relative to the mobile computing device and can have a fixed angle or adjustable angles. The holder can include two or more portions that are connectable in two or more different positions to hold the mobile computing device in at least two orientations, such as landscape and portrait orientations, and/or to accommodate devices of different sizes. In some configurations, the holder can incorporate a peripheral device.

A holder for a mobile computing device comprises a body that contacts at least two opposing side surfaces of the mobile computing device to mount the holder to the mobile computing device, wherein the mobile computing device is held within a device space of the holder; a handle extending from the body, wherein the handle has a handgrip portion that is spaced laterally from the device space.

In some configurations, the handle defines a handgrip portion and wherein an axis of the handgrip portion defines an angle with a plane of the device space. The handle can be adjustable between at least a first angled position, a second stowed position and a third stand position.

In some configurations, the mobile computing device is a tablet computer and the body is sized and shaped to accommodate the tablet computer.

In some configurations, the body comprises a first portion, a second portion and a coupling arrangement that couples the first body portion and the second body portion in either one of a first position and a second position, wherein a first contact surface of the first body portion and a second contact surface of the second body portion face one another and define the device space therebetween, and wherein the holder defines a first dimension between the first contact surface and the second contact surface in the first position and a second dimension between the first contact surface and the second contact surface in the second position, and wherein the first dimension is different from the second dimension.

A holder for a mobile computing device comprises a first body portion having a first contact surface; a second body portion having a second contact surface; a handle coupled to one of the first and second body portions; a coupling arrangement that couples the first body portion and the second body portion in either one of a first position and a second position, wherein the first contact surface and the second contact surface face one another and define a device space therebetween that receives the mobile computing device; wherein the holder defines a first dimension between the first contact surface and the second contact surface in the first position and a second dimension between the first contact surface and the second contact surface in the second position, and wherein the first dimension is different from the second dimension.

In some configurations, the coupling arrangement comprises an elongate tongue carried by one of the first and second body portions and a lock arm carried by the other of the first and second body portions, wherein the elongate tongue and the lock arm comprise interlocking surface features that permit the lock arm to secure the elongate tongue in at least the first position and the second position. The coupling arrangement can permit the first and second body portions to be coupled in one or more positions in addition to the first and second positions. The elongate tongue can define a plurality of teeth on any combination of a back surface, first side surface and second side surface.

A peripheral device holder for a tablet computer comprises a first body portion having a first contact surface; a second body portion having a second contact surface; a peripheral device carried by one of the first and second body portions; and a coupling arrangement that couples the first body portion and the second body portion to secure the holder and the peripheral device to the tablet computer.

In some configurations, the peripheral device is integrated with the one of the first and second body portions. In other configurations, the peripheral device is separable from the one of the first and second body portions.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION OF THE PREFERRED EMBODIMENTS

Figure 1:
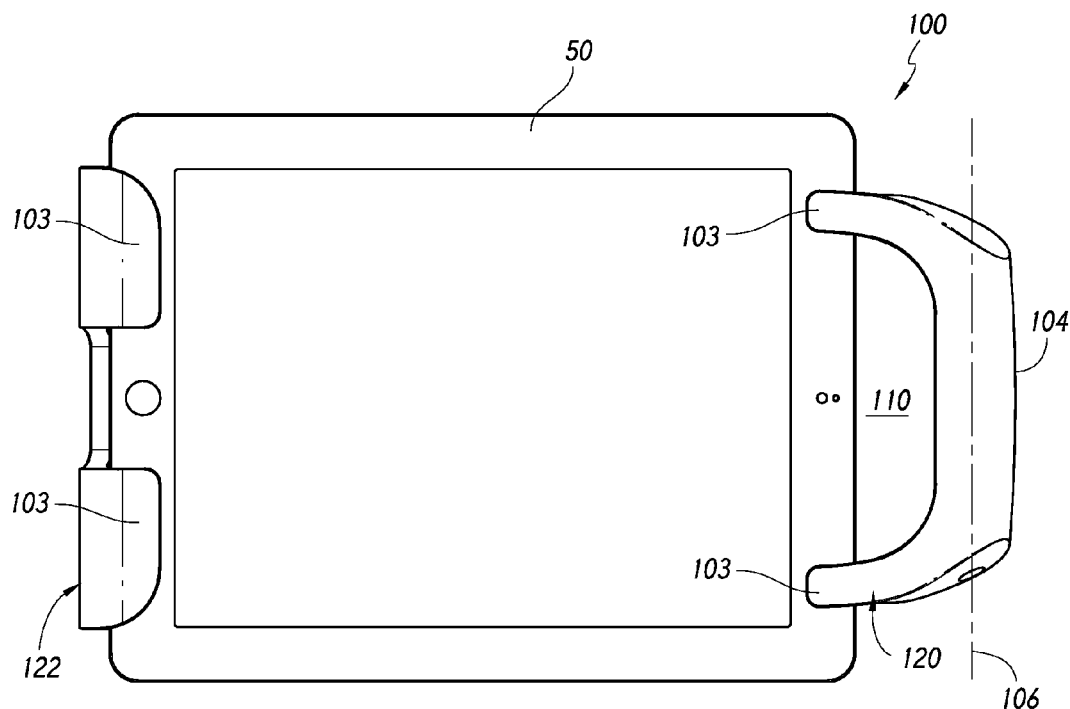
FIG. 1 is a front view of a holder engaged with a mobile computing device with the device in a landscape position relative to the holder.

FIGS. 1-17 illustrate a holder for a mobile computing device, such as a tablet computer or the like. For convenience, the mobile computing device is referred to as a "device" herein. The term "mobile computing device" or "device" is a broad term used in accordance with its ordinary meaning and is intended to include, but is not limited to, tablet computers and similar devices, such as portable digital readers, combination laptop computer/tablet devices (which typically have a tablet "mode") and portable touchscreen-controlled devices that may fulfill a specific function or be a part of a specific system, rather than a general purpose computer. Unless otherwise indicated, the term "mobile computing device" can include smartphone devices. However, because some aspects of the present holders are directed toward larger devices, the term "tablet computer" is generally not intended to cover smartphones unless otherwise indicated. The holder can be constructed from any suitable material by any suitable process. In some configurations, the holder is constructed from a relatively rigid plastic that is capable of retaining its formed shape during normal use. The holder, or portions of the holder, can be constructed from other suitable materials or a combination of materials (e.g., hard rubber, metal). The holder can be injection molded or otherwise formed (e.g., machined).

The holder 100 can be secured or engaged with a device 50 and, preferably, can be easily and quickly assembled to and removed from the device 50. In many configurations, the holder 100 incorporates a handle 102; however, certain aspects of the disclosed holders can be used in configurations without a handle 102 or with a different type or location of handle 102. Furthermore, in some configurations, the holder 100 may have more than one handle 102. For example, a pair of handles 102 could be provided on opposing sides of the holder 100. Or, handles 102 could be provided on adjacent sides of the holder 100 to facilitate holding in portrait or landscape orientations (by separate handles) without disassembly of the holder 100 from the device 50. In the illustrated configuration, the holder 100 does not completely surround the device 50 and, in particular, does not contact all sides of the device 50. In some configurations, the holder 100 contacts only two (preferably opposing) sides of the device 50. In addition, preferably the holder 100 extends between the two sides of contact along the back of the device 50 opposite the display screen (which may be a touch screen). In some configurations, the holder 100 does not contact an entire length of the sides of the device 50 with which it is in contact. In other words, a maximum width of the holder 100 can be less than a maximum length of any or all of the sides of the device 50 to which the holder 100 is assembled. In some cases, the holder 100 could contact the entire length of the sides of the device 50 (in at least one orientation) or could extend beyond one or both ends of the sides of the device 50, such as in the case of a small tablet computer. The holder 100 can have a single portion or section that extends along the back of the device 50, as illustrated, or can have multiple (e.g., two, three, four or more) portions or sections, any one or more of which can include a coupling arrangement as described hereinbelow. The holder 100 can be generally or substantially symmetrical about a central plane that passes through a length of the holder 100 to provide left-right balance when held by the handle 102 or can be asymmetrical, if desired.

However, in other arrangements, the holder can contact all sides of the device and can also contact the front, the back or both the front and the back of the device. In some such configurations, the holder can be a case or case-like arrangement which can surround a substantial portion of the sides and back of the device and can, but does not necessarily, provide a protective function to the device 50. See, for example, FIGS. 30-34 and FIGS. 35-39.

In the illustrated configuration, the holder 100 includes hook-shaped or hook-like portions 103 that receive and, preferably, grasp each side of the device 50. The hook portions 103 can contact any combination of front, side and back surfaces. In some configurations, the hook portions 103 contact the side surfaces of the device 50 and contact a larger area of the back surface (laterally and/or longitudinally) than a front surface of the device 50. Preferably, the hook portions 103 do not cover the display screen of the device 50. The hook portions 103 can correspond or extend from the side supports of the handle 102. On the opposite side of the holder 100, the hook portions 103 can create an access space that permits access to a port of the device 50 when the device 50 is arranged longitudinally relative to the holder 100. The contact surfaces of the hook portions 103 can include soft material or grip material 105 (see, for example, FIG. 5) to avoid damage to the device 50. Such material can be in the form of an insert (e.g., co-molded or overmolded) or otherwise secured to the body of the holder 100. Any or all surfaces of the hook portions 103 can include raised surface portions (e.g., bumps, ribs or hemispherical surfaces) to reduce or minimize contact between the holder 100 and the device 50. In some configurations, the soft or grip material 105 can be used in combination with raised surface portions, such as soft or grip material 105 on the surfaces of the hook portions 103 positioned adjacent the end and back of the device 50 and raised surface portions position adjacent the front surface of the device 50.

The contact surfaces of the hook portions 103 can be shaped to correspond to the shape of the particular device(s) 50 intended for use with the holder 100 or can be shaped to accommodate a variety of device shapes. For example, the illustrated hook portions 103 (FIG. 7, for example) can include a curved surface portion (e.g., bottom of groove defined by hook portion) and a planar surface portion (e.g., top of groove defined by hook portion). In other configurations, the hook portion 103 can define a substantially rectangular or square groove shape and use grip or cushion material to conform to the device shape. Other shapes could also be used, such as a wedge shape to accommodate different device thicknesses. The hook portions 103 (or other device contact structures) could be adjustable to accommodate different device shapes or sizes.

The holder 100 retains the device 50 in a device space, which can be defined by the space occupied by the device 50 or the sides of the device 50 that are contacted by the holder 100. In the illustrated configuration, the handle 102 is located outside of the device space and, preferably, laterally outside of the device space. That is, preferably, a significant portion or the entirety of the handle 102 is located to the side of the device space.

In some configurations, the handle 102 defines a handgrip portion 104, which allows a user to grasp the handgrip portion 104. The handgrip portion 104 preferably is sized and shaped to allow a user to wrap his or her entire hand around the handgrip portion 104. Thus, the handgrip portion 104 can define an axis 106 (which can be a straight line, a substantially straight line or a curved line) and can define a space 110 between the device 50 and the handgrip portion 104. Preferably, the space 110 is sufficiently large to permit a user to pass an entirety of at least one and preferably all fingers of one of his or her hands through the space 110 in order to grasp the handgrip portion 104.

In some configurations, the handle 102 is rigidly-formed such that it retains its shape in response to normal use—with or without a user grasping the handle 102. In other words, in at least some configurations, the handle 102 is not constructed from a stretchable or flexible material or is not held to the body of the holder 100 by a stretchable or flexible material.

Figure 7:
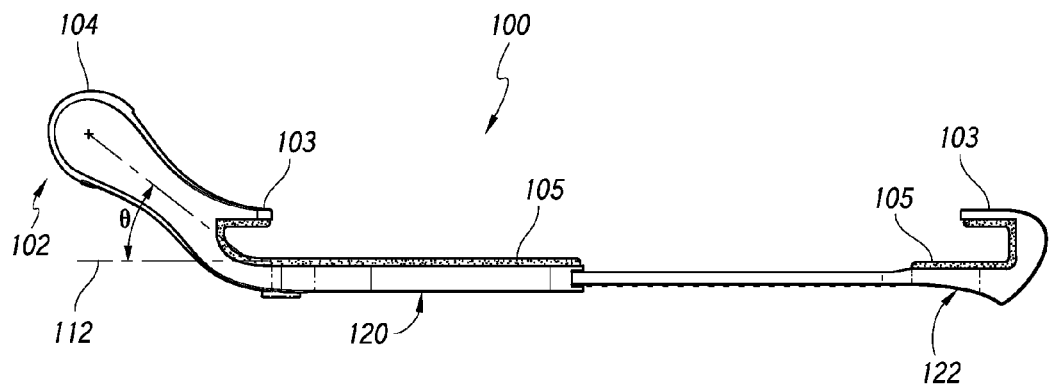
FIG. 7 is a side view of the holder of FIG. 5.
Figure 8:
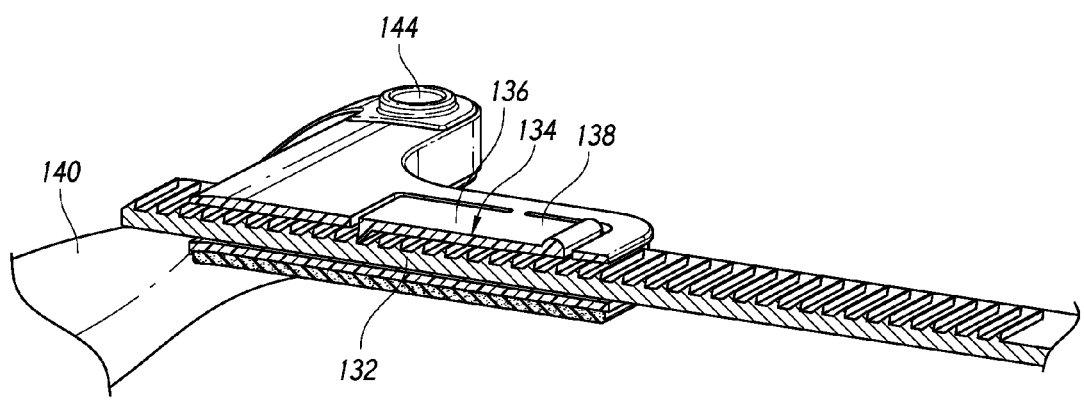
FIG. 8 is a sectional view of a coupling arrangement of the holder of FIG. 5.
Figure 9:
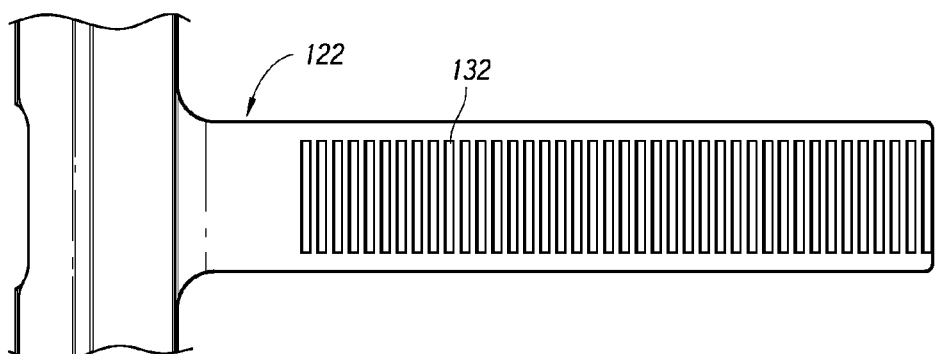
FIG. 9 is a rear view of a tongue member of the coupling arrangement of FIG. 8.

With reference to FIG. 7, in some configurations the handle 102 defines an angle $\ominus$ with respect to the device space 110 and, in particular, with respect to a plane 112 defined by the device space 110. For example, the plane 112 can be defined by a front surface, a rear surface or an average between the front surface and the back surface of the device 50 held within the device space or by corresponding surfaces (or an average of the surfaces) of the holder 100 that contact the device 50. The angle $\ominus$ can be defined by a line that passes through the axis 106 of the handle 102 and extends along the side of the handle 102 or, in some cases, such as odd-shaped handle sides, extends through the plane 112 at a point corresponding to an edge of the device 50. Such a point can be defined by a surface of the holder 100 or by a point in space that corresponds to a surface of the device 50 in a position held by the holder 100. In some cases, the angle $\ominus$ can be defined by a line that passes through the axis 106 of the handle 102 and a location at which the handle 102 meets the base of the holder 100. In some configurations, the angle $\ominus$ can be between about 0 and about 60 degrees, about 0 degrees and about 45 degrees, between about 0 degrees and about 33 degrees, or between about 0 degrees and about 20 degrees, including any value or range of values within these ranges. In some configurations, the angle $\ominus$ is about 33 degrees. Although shown as angled toward a front side of the device 50, the angle $\ominus$ (including the above-recited angles) can be angled toward a rear side of the device 50, if desired. Thus, the above recited ranges can include positive and negative angles, positive angles only or negative angles only. In addition, the angle $\ominus$ can be a range bounded by any combination of the above-recited values (e.g., about −20 degrees to about 45 degrees or about −33 degrees to about 33 degrees).

Figure 40:
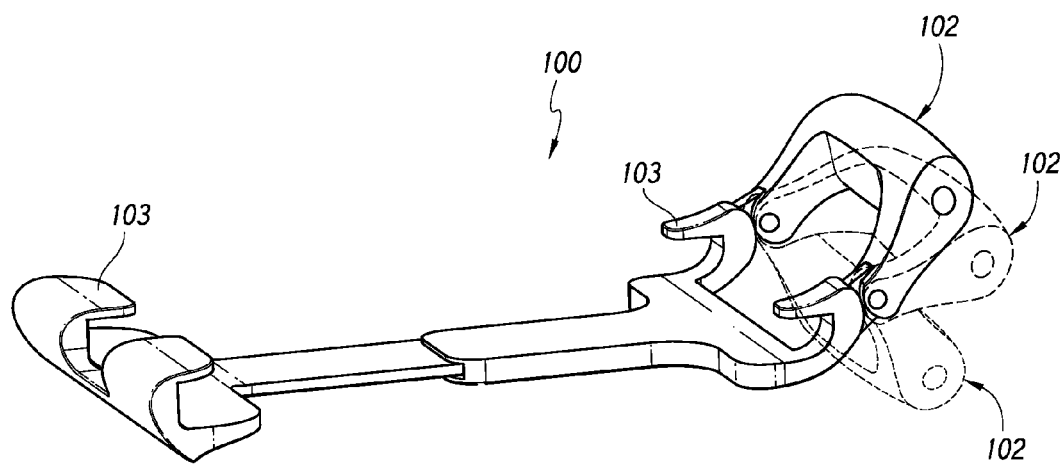
FIG. 40 is a perspective view of a holder in which an angle of the handle is adjustable.

In some configurations, the angle $\ominus$ of the handle 102 can be fixed. In other configurations, the handle 102 can be adjustable within a range of adjustment positions, which could be the same as or different from the ranges or positions recited above. The handle 102 can be infinitely adjustable within the adjustment range or can be adjustable between a plurality of discrete positions. In some configurations, the handle 102 can be adjustable between one or more angled positions, a carrying position aligned or generally aligned with the device space/device plane 112, and a support position located opposite the device space/device plane 112 from the angled positions such that the handle 102 can function as a stand. For example, the handle 102 can be coupled to the base portion of the holder 100 by one or more pivot assemblies. One or more of such pivot assemblies can incorporate a detent or lock mechanism to allow the handle 102 to be selectively secured in one of a plurality of available adjustment positions. The pivot assemblies could provide resistance to movement of the handle 102 such that the handle 102 is infinitely adjustable within a range of motion without (or in between) discrete detent or lock positions. An example of an adjustable handle 102 is illustrated in FIG. 40.

The holder 100 preferably includes at least a first piece or portion 120 and a second piece or portion 122 that can be coupled together via a coupling arrangement 130. In some configurations, the coupling arrangement 130 is an adjustable coupling arrangement that permits the first portion 120 and the second portion 122 to be coupled in at least two different positions relative to one another. In some configurations, the device 50 can be held in two different positions relative to the holder 100, which preferably have different dimensions between the surfaces of the holder 100 that contact the device 50 (e.g., landscape mode of FIGS. 1 and 2 and portrait mode of FIGS. 3 and 4). Portrait and landscape are used herein for convenience to refer to the orientations shown in the figures. Although the handle 102 is on the side in the illustrated configuration, its normal position could be on the top or bottom, as well. Thus, the description of portrait or landscape modes is not dictated by where the handle 102 is located. In some configurations, the coupling arrangement 130 has multiple positions such that the holder 100 can accommodate devices 50 of different sizes in one or both portrait and landscape modes.

Figure 2:
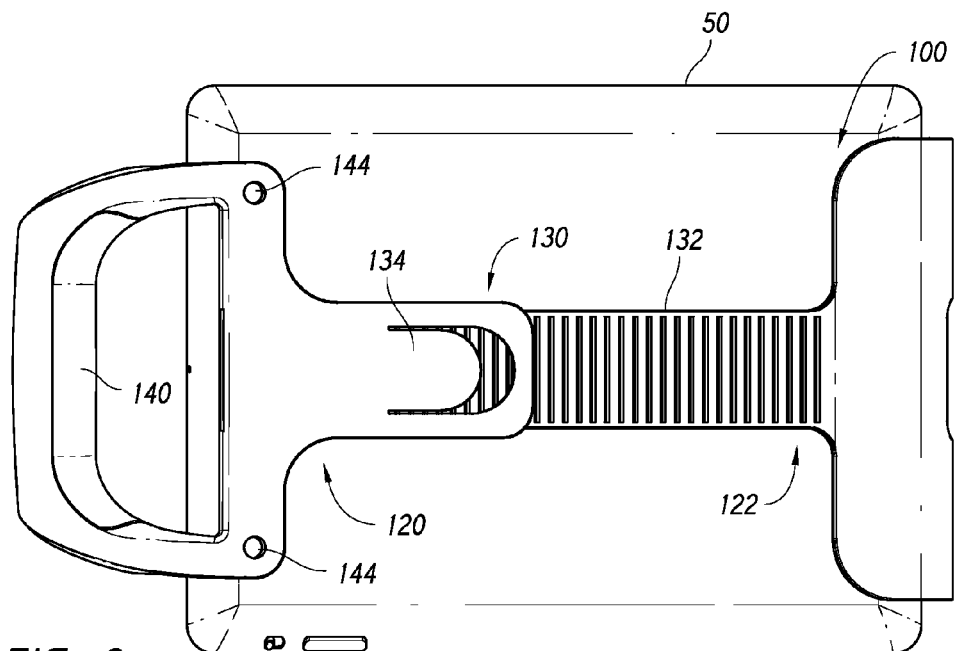
FIG. 2 is a rear view of the holder and device of FIG. 1.
Figure 3:
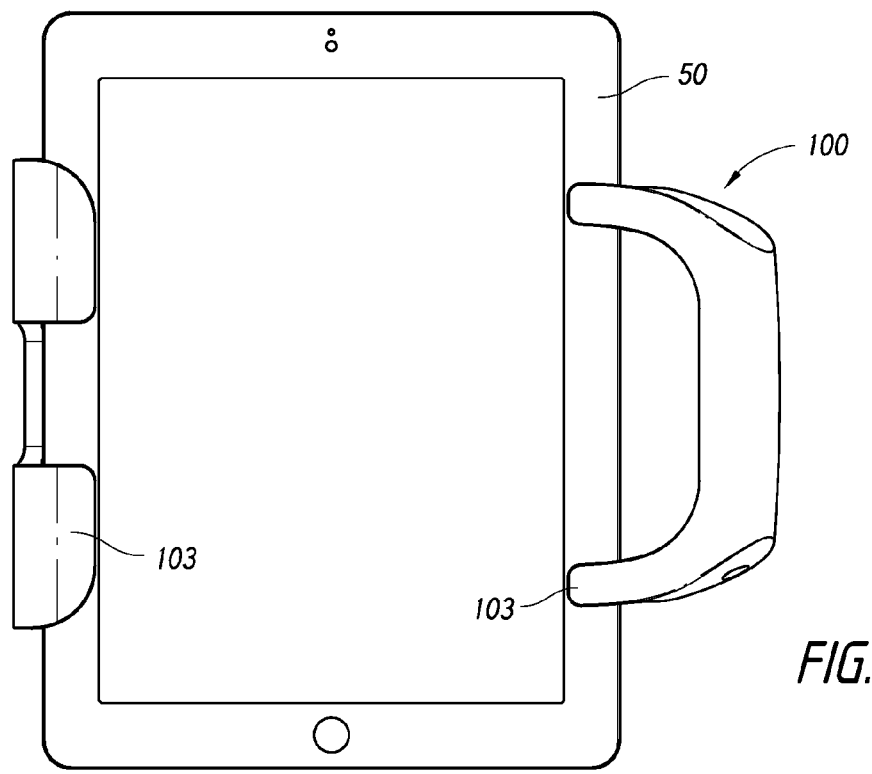
FIG. 3 is a front view of the holder and device of FIG. 1 with the device in a portrait position relative to the holder.
Figure 4:
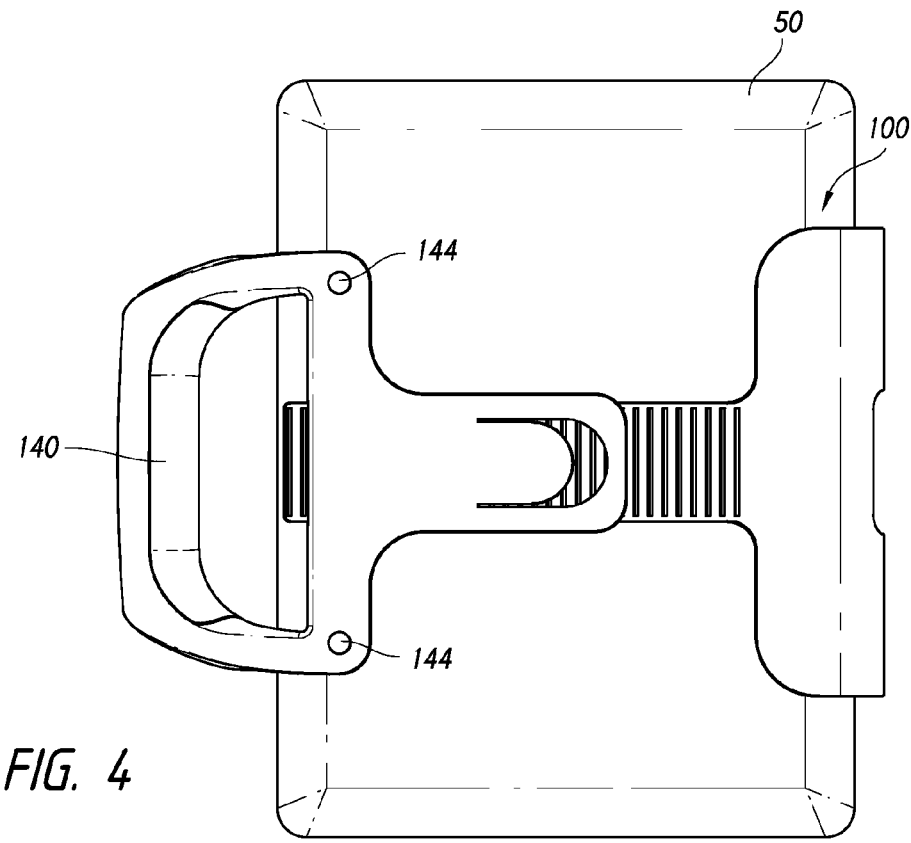
FIG. 4 is a rear view of the holder and device of FIG. 1 in the portrait position of FIG. 3.
Figure 5:
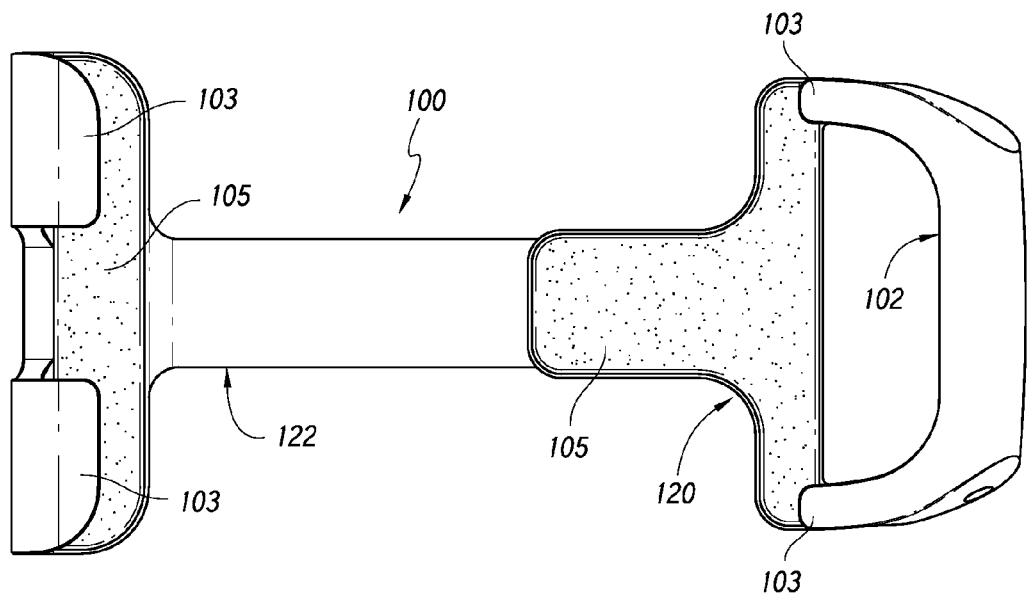
FIG. 5 is a front view of a holder similar to the holder of FIG. 1 without the device.
Figure 6:
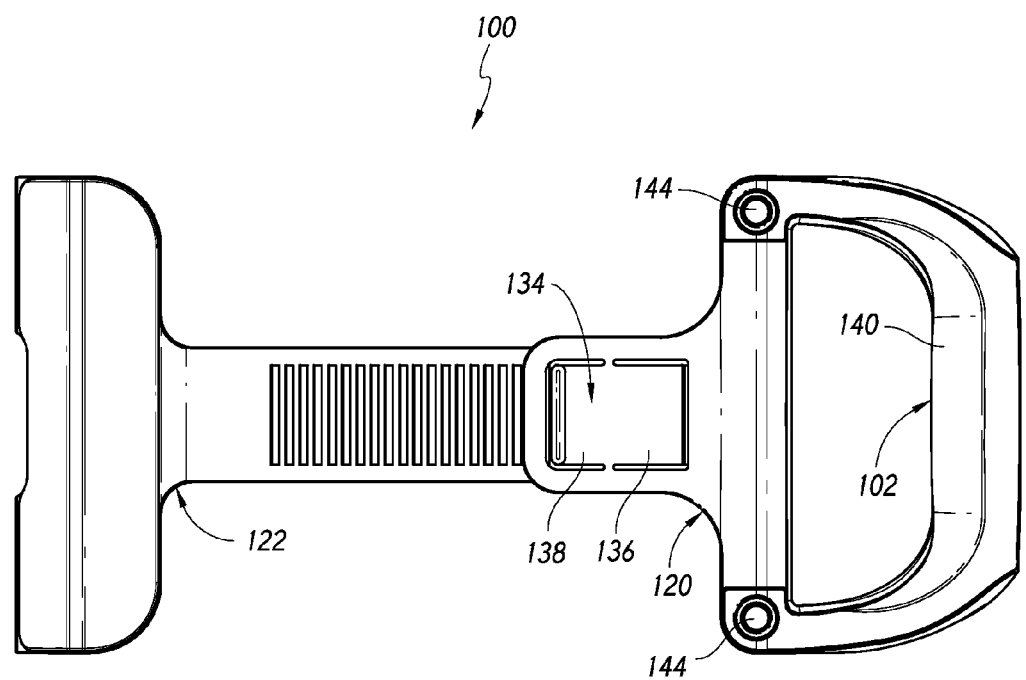
FIG. 6 is a rear view of the holder of FIG. 5.
Figure 10:
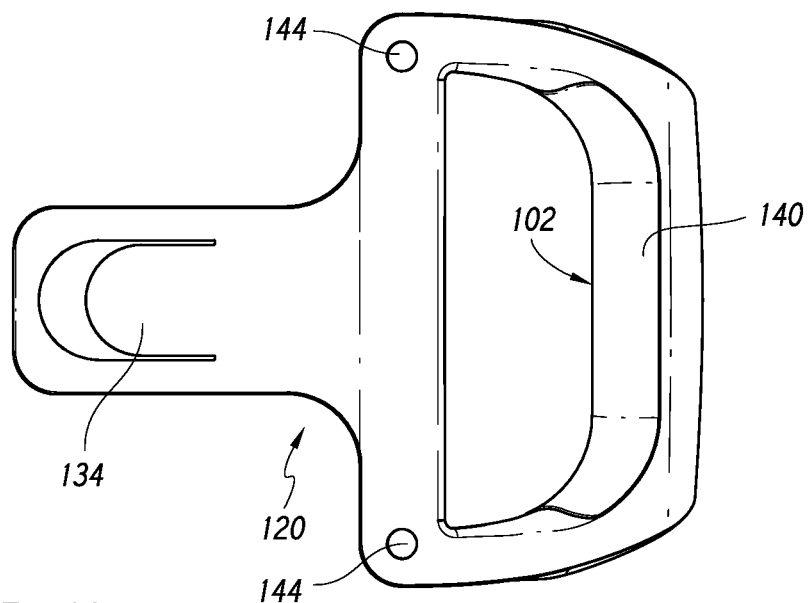
FIG. 10 is a rear view of a handle portion of the holder of FIG. 1.
Figure 11:
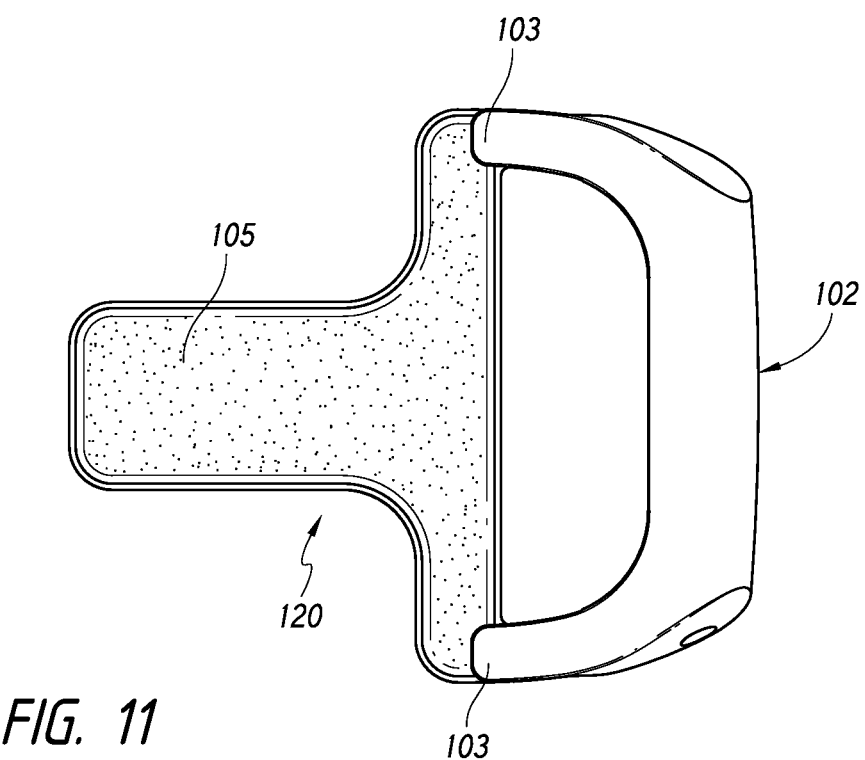
FIG. 11 is a front view of the handle portion of FIG. 10.
Figure 12:
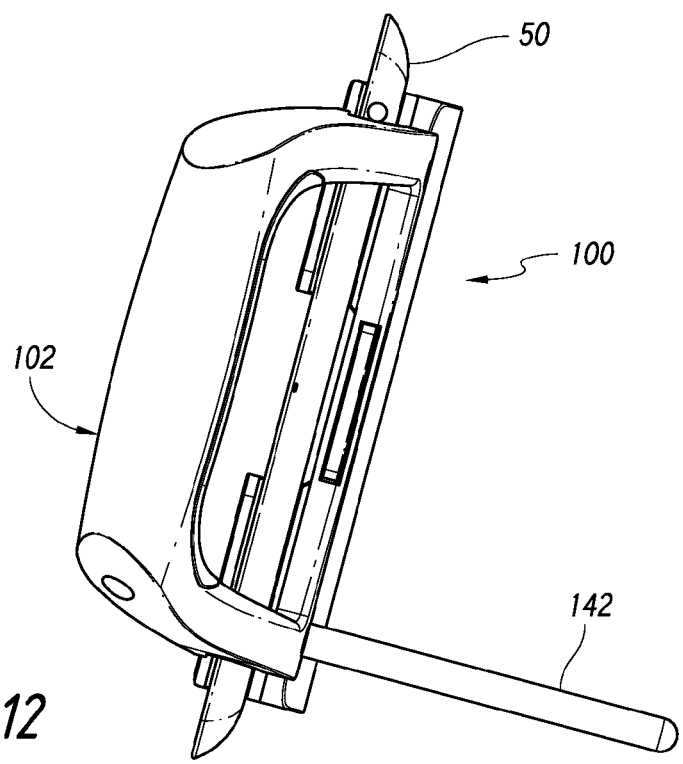
FIG. 12 is a side view of the holder of FIG. 1 and device utilizing a stand.
Figure 13:
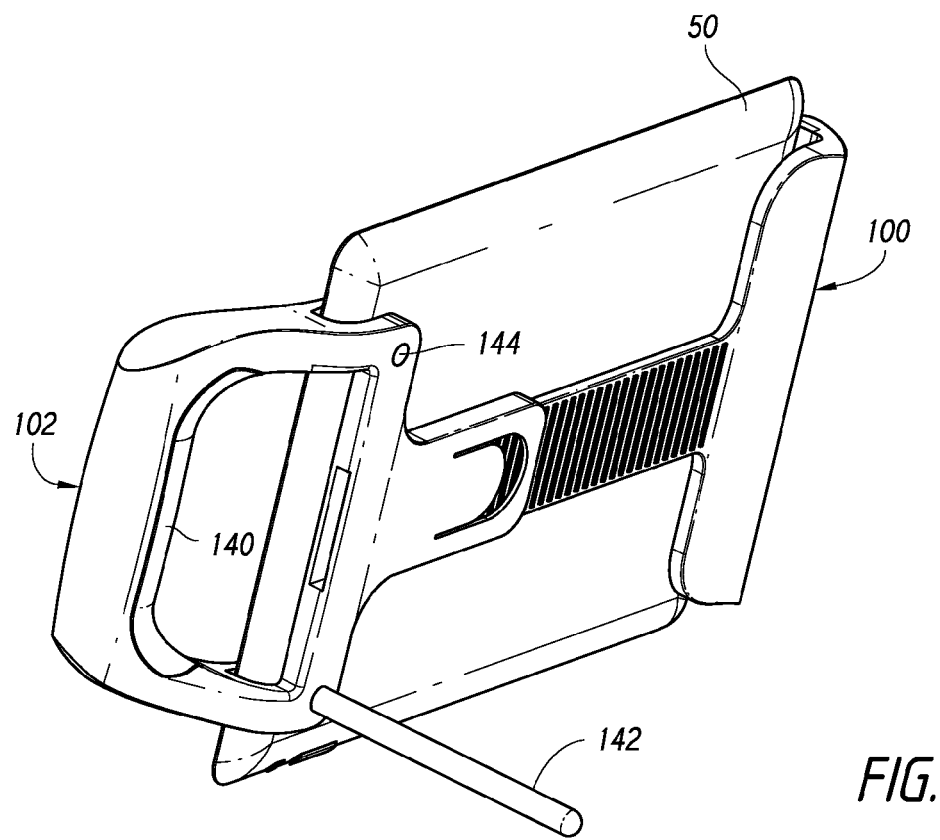
FIG. 13 is a rear perspective view of the holder and device of FIG. 12 utilizing the stand.

The coupling arrangement 130 can be any suitable arrangement that permits the first portion 120 and the second portion 122 to be selectively coupled together, directly or indirectly. The coupling arrangement 130 can be biased to a normally-locked position and can be selectively moved to an unlocked position. The illustrated coupling arrangement 130 comprises a multi-position interlocking arrangement, such as a multi-position latch, which can include a first portion defining a locking member or lock arm that engages one or more of a plurality of protrusions or teeth of a second portion. In the illustrated configuration, the second portion includes an elongate strap or tongue 132 that defines or carries the protrusions or teeth. The illustrated protrusions or teeth are located on a rearward-facing surface of the tongue 132 (facing away from the device 50); however, protrusions or teeth could also (or alternatively) be located on the side surface(s) of the tongue 132. The protrusions or teeth could be located on the side of the tongue 132 facing the device 50, but it is preferred that the protrusions or teeth do not directly contact the device 50. Thus, support surface(s) could be provided to space the teeth away from the surface of the device 50. The locking member can be a lock arm 134, which can be unitarily-formed with the first portion 120 of the holder 100. In some configurations, the lock arm 134 is at least partially defined by a generally or substantially U-shaped cut-out, as shown in FIGS. 2, 4 and 10, for example. The lengths of the sides of the cut-out can be selected to adjust the flexibility of the lock arm 134 and, thus, the locking strength of the lock arm 134. The lock arm 134 can be normally-biased to a locked position and can be manually or otherwise deflectable to an unlocked position. Additional or alternative arrangements can also be used, such as material thickness, material type, strengthening members, etc. to adjust the strength of the lock arm 134. Preferably, the teeth of the tongue 132 and the engagement member (e.g., tooth) of the lock arm 134 are configured to allow relative movement of the first portion 120 and second portion 122 in a first direction (e.g., assembly direction) and to inhibit or prevent movement in a second direction (e.g., disassembly direction).

In the illustrated arrangement of FIGS. 5-9, for example, the lock arm 134 includes lock portion 136 that is defined by the above-mentioned cut-out and a release portion 138 that is at least partially defined by a second cut-out, which also can be generally or substantially U-shaped. The bases of the two U-shaped cut-outs are positioned opposite one another and the cut-outs are aligned in a lateral direction relative to a central, longitudinal plane of the holder 100. The free ends of the two U-shaped cut-outs are spaced from one another such that a solid material "hinge" is provided between them. With such an arrangement, the lock arm 134 pivots about the "hinge" when the user presses on the release portion 138. The lock portion 136 of the lock arm 134 includes at least one engagement member (e.g., tooth) that engages the teeth of the tongue 132. Preferably, the at least one engagement member engages the teeth of the tongue 132 in a normal position of the lock arm 134 and can be disengaged from the teeth of the tongue 132 when the release portion 138 is pressed to permit adjustment of the first portion 120 and the second portion 122 of the holder 100. The release portion 138 can include a tab that facilitates release movement of the lock arm 134.

The lock arm 134 can include one or more structures (e.g., protrusions or teeth) that engage the protrusions or teeth of the tongue 132. In configurations in which the protrusions or teeth are located on the side of the tongue 132, a pair of side squeeze locking members can be employed that are normally-biased into an engaged position and can be squeezed into a released position. If desired, an additional locking member can be used to secure the lock arm 134 in the locked position (e.g., a locking lever or other structure can be manually moved into a blocking position to block the lock arm 134 from moving away from its normally-biased locked position). Such a locking member could be a sliding member that slides along the first portion 120 of the holder 100, a pivotal member or otherwise movable or normally-biased into a blocking position.

The length of the tongue 132 (and/or length of the portion containing the lock arm 134) can be adjusted to permit the holder 100 to accommodate multiple sizes of devices 50. Preferably, the holder 132 can accommodate at least two sizes or orientations of devices 50 without the tongue 132 bottoming out on the first portion 120 or passing through (or not substantially protruding from) an opening (see FIGS. 16-19) in the first portion 120. In some configurations, the tongue 132 has a length between about 3 inches and about 7.85 inches (or 8 inches). In other configurations, the tongue 132 has a length between about 3 inches and about 5.85 inches (or 6 inches). In some configurations, the tongue 132 has a length of about 5.85 inches (or 6 inches). However, in other configurations, the tongue 132 can have longer or shorter lengths to suit the desired application.

In some configurations, the tongue 132 could be a separate component from the remainder of the second portion 122 and could be interchangeable with another tongue 132 of a different length to permit the holder 100 to accommodate multiple sizes of devices 50. The holder 50 could be sold in a kit with two or more interchangeable tongues 50 of different lengths to permit the holder 50 to be configured for use with devices 50 of different sizes or the same device 50 in different modes (e.g., portrait vs. landscape). The tongue 132 and lock arm 134 could be switched to the opposite of the first portion 120 and second portion 122 relative to the arrangement shown herein.

The holder 100 can be shaped as necessary or desired for ease-of-use, such as to lay flat if desirable, to provide multiple gripping points, etc. In some configurations, the second portion 122 defines a grip shape to facilitate holding of the holder 100 opposite the handle 102 (see FIG. 7, for example). The second portion 122 (or other portions of the holder 100) can include grip material to enhance grip (see FIG. 18).

Figure 14:
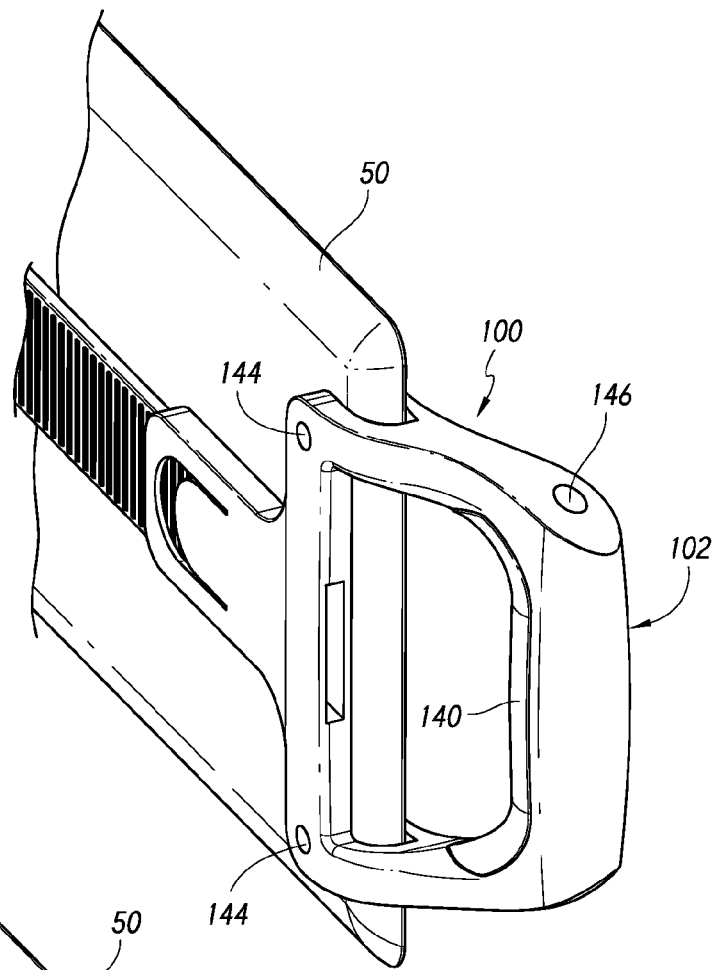
FIG. 14 is a rear perspective view of the holder and device of FIG. 12 showing a stand holder in the handle without the stand.
Figure 15:
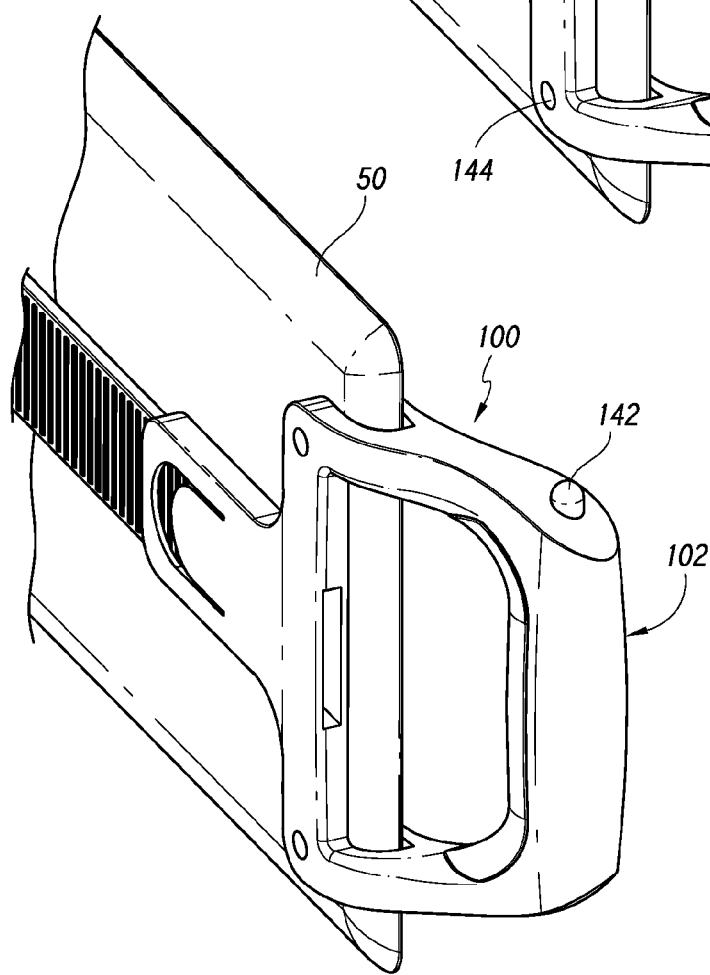
FIG. 15 is a rear perspective view of the holder and device of FIG. 14 with the stand in the stand holder.
Figure 16:
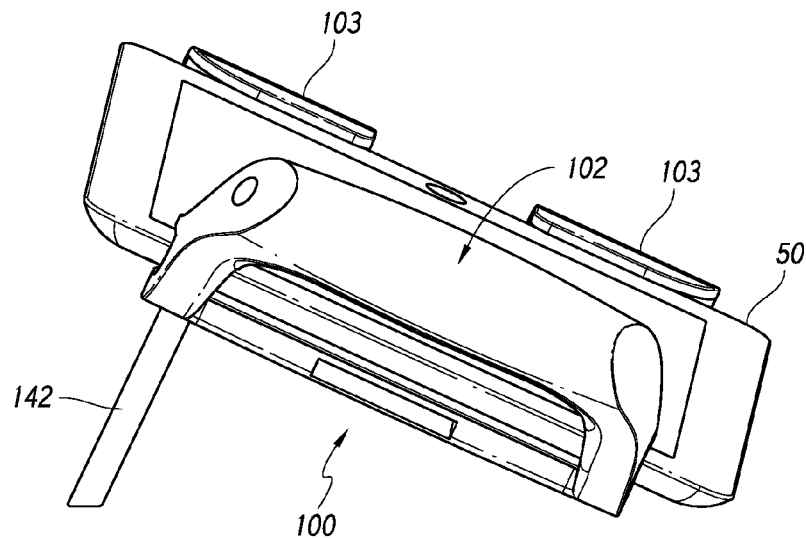
FIGS. 16 and 17 are side perspective views of a holder and device utilizing a stand in two different orientations.
Figure 17:
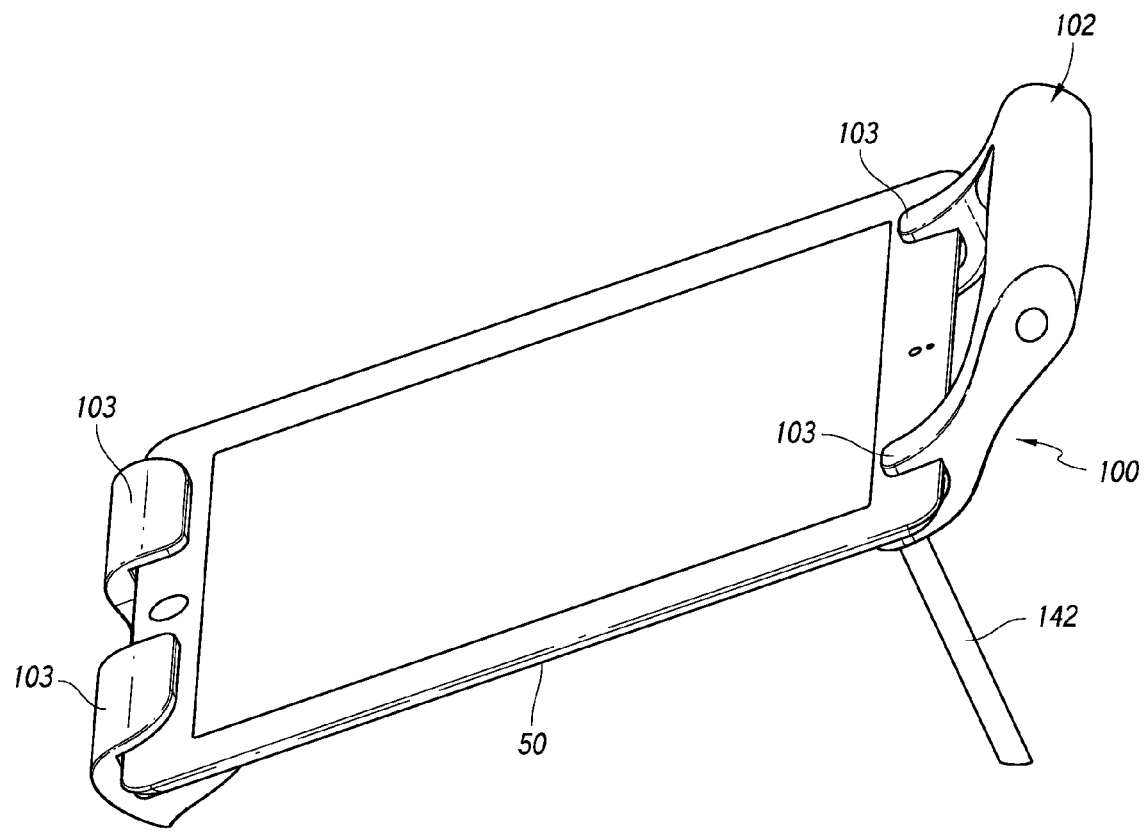
Figure 18:
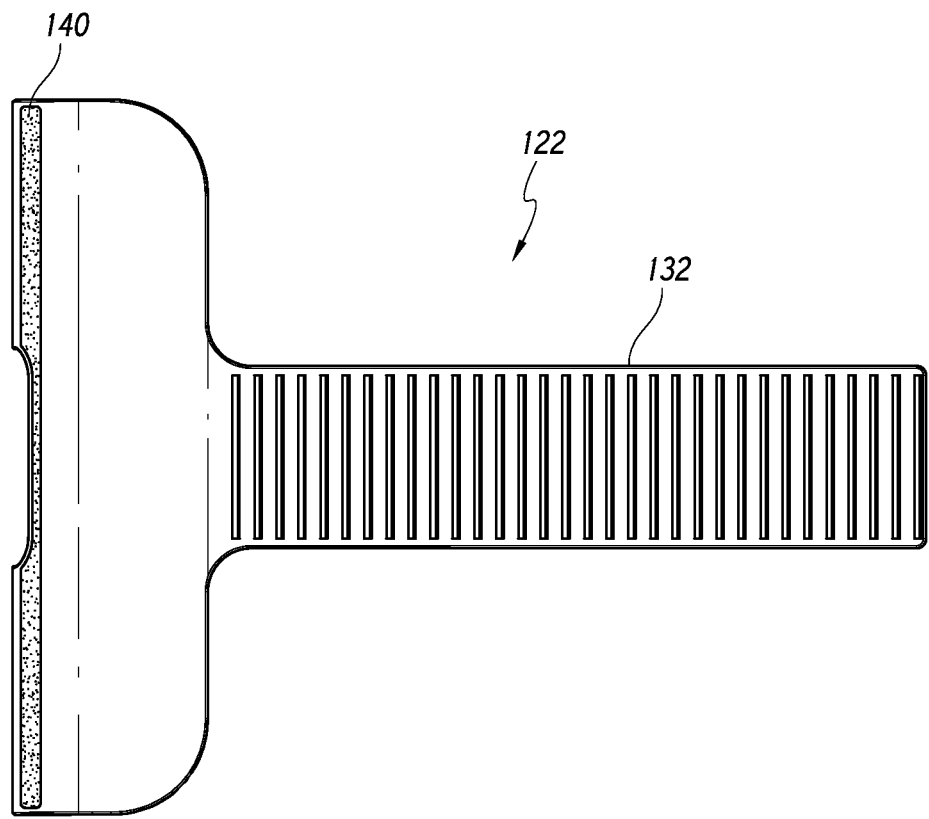
FIG. 18 is a rear view of a portion of an alternative holder having a grip surface.
Figure 20:
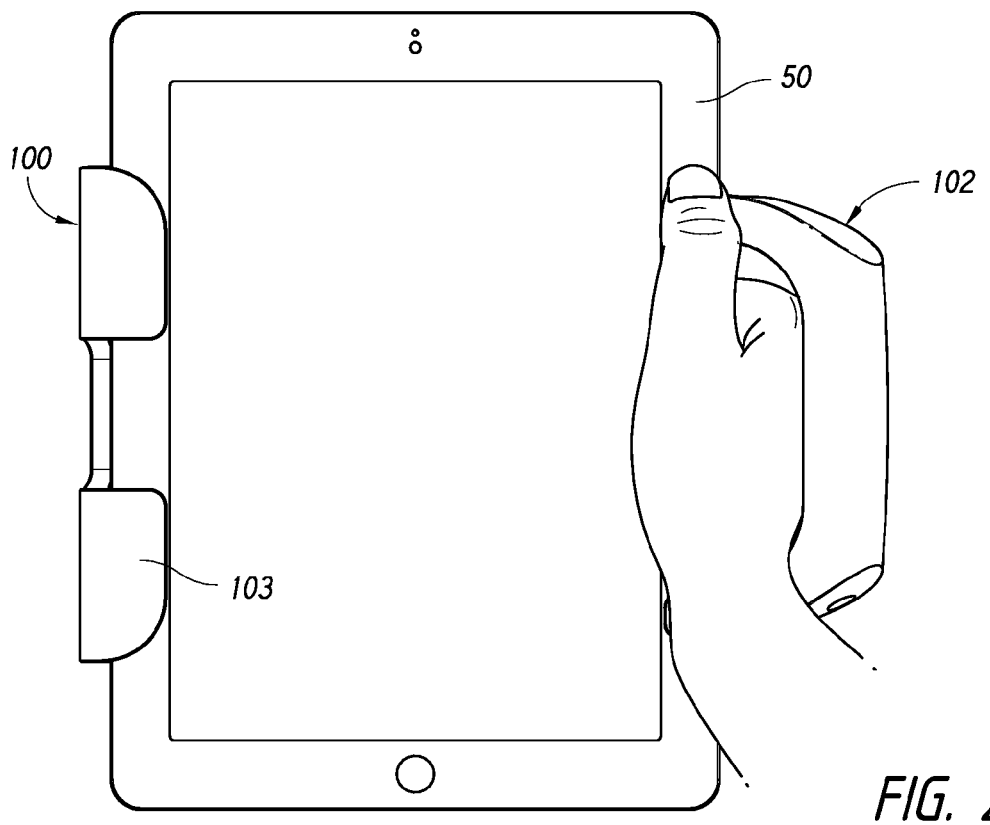
Figure 21:
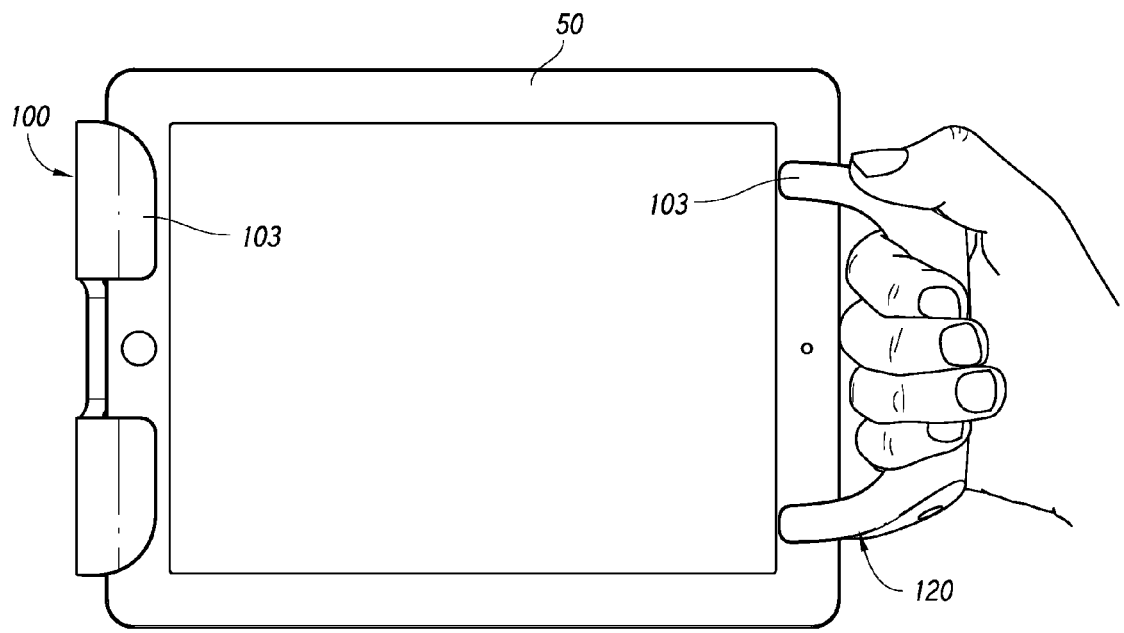
Figure 22:
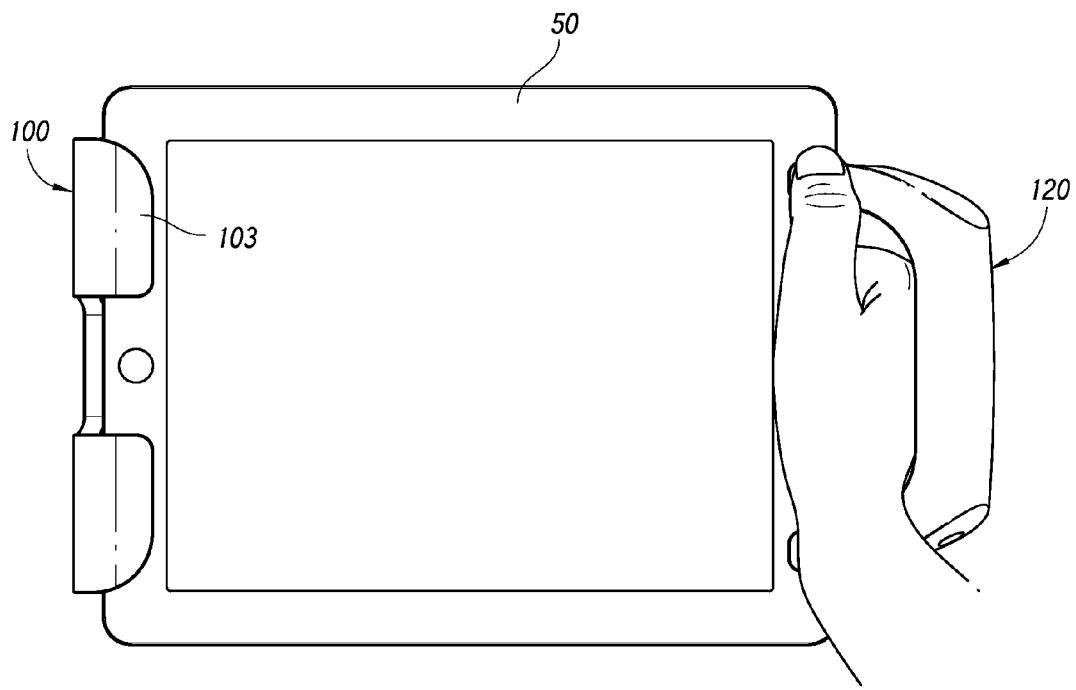

The handle 120 can include grip or cushion material 140 on at least an interior surface (facing the space 110) of the handle 120. The cushion or grip material 140 can be softer and/or possess better grip properties relative to the material(s) from which the surrounding portions of the handle 102 are constructed. The holder 100 can also include a kickstand 142 (FIGS. 12 and 13), which can be received by ports 144 provided on the holder 100 (FIGS. 2 and 4). The holder 100 can include a storage arrangement for the kickstand 142, such as a storage cavity 146, which can be located in the handle 102, for example (FIGS. 14 and 15). The kickstand 142 can be secured in the ports 144 and/or storage cavity 146 by any suitable arrangement, including a loose fit, a friction fit, a snap-fit, threaded connection or magnetic connection, for example and without limitation. FIGS. 20-22 illustrate additional orientations utilizing a kickstand 142. The kickstand 142 can be of any suitable or desirable length, including between about 1.5 inches and about 4.5 inches, between about 2 inches and about 4 inches, and about 4 inches.

Figure 19:
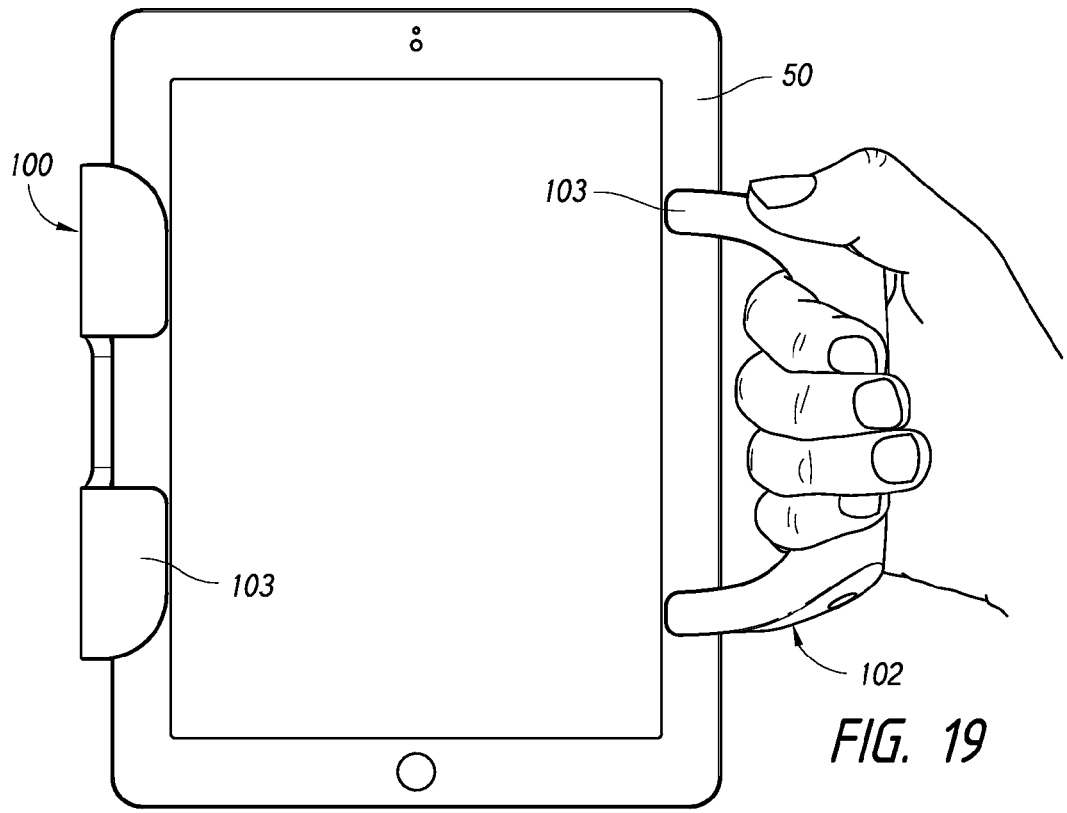
FIG. 19-24 are various illustrations of methods for utilizing a handle of the holder to hold or carry the device.
Figures 23, 24:
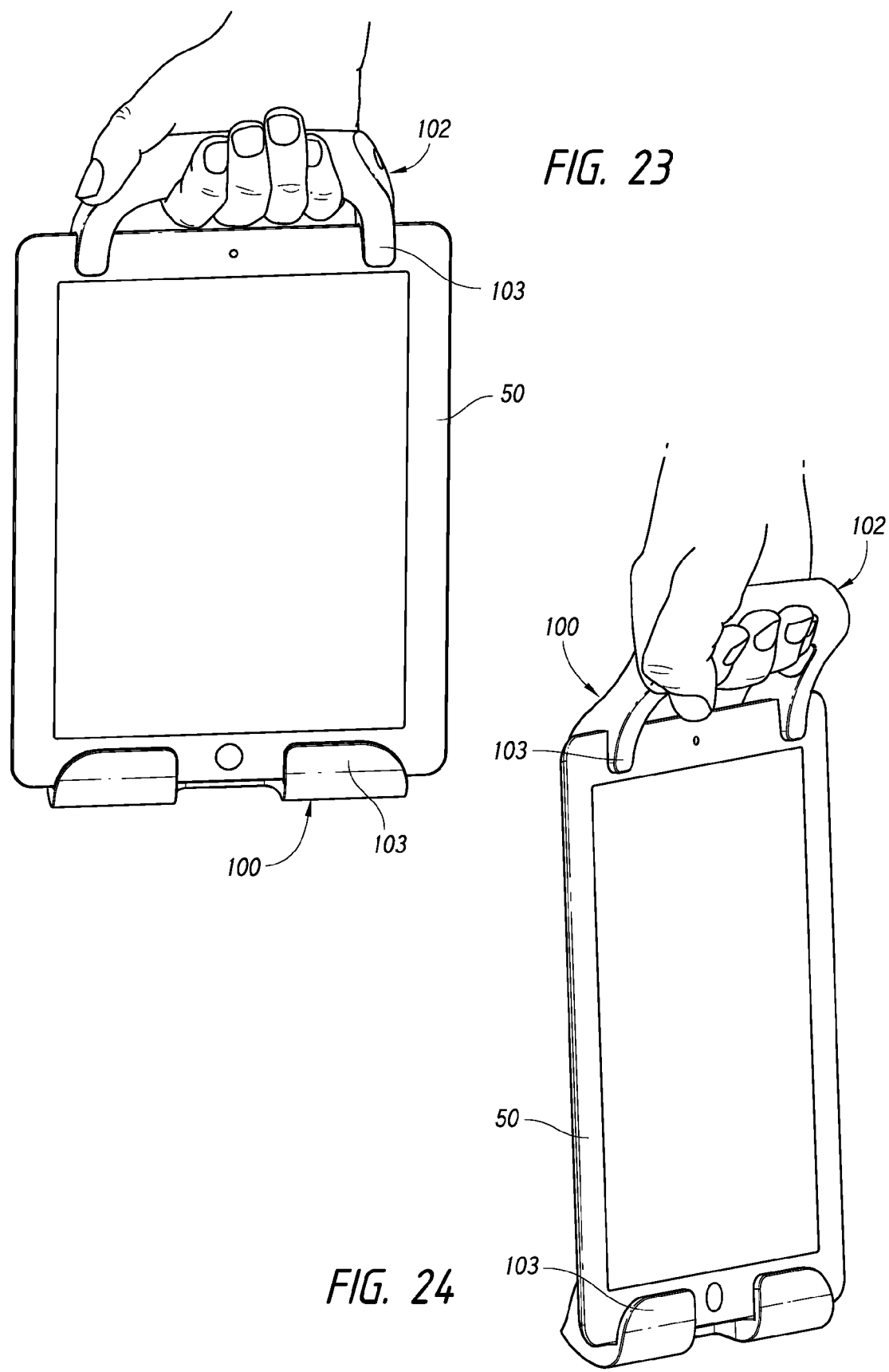
Figure 25:
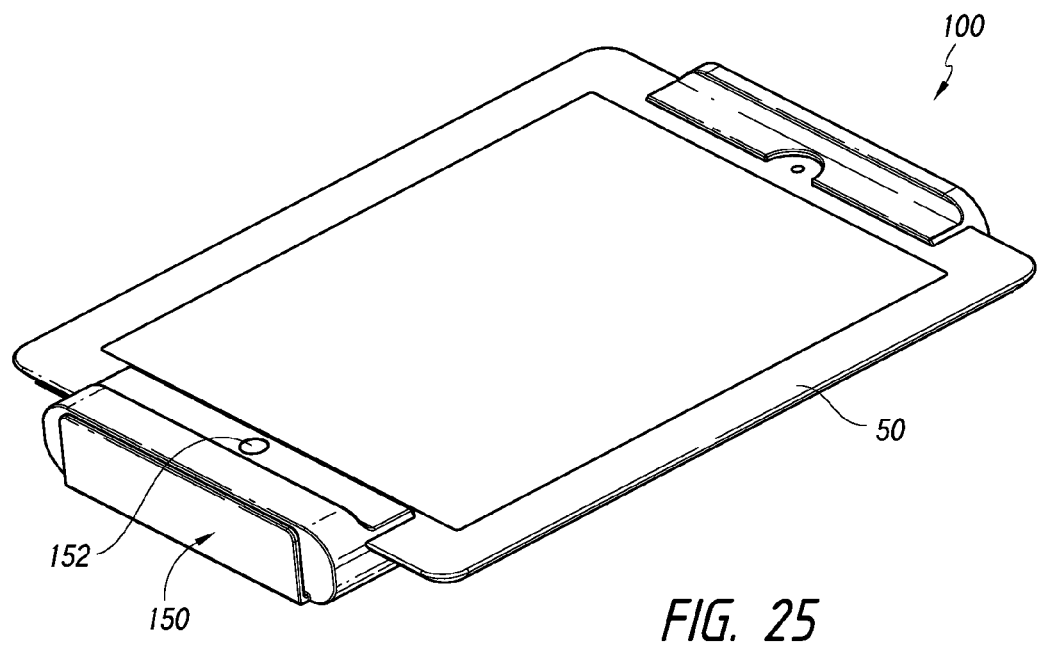
FIGS. 25-28 are various views of another holder and device wherein the holder carries or incorporates a peripheral device, such as a card reader, for example and without limitation.
Figure 26:
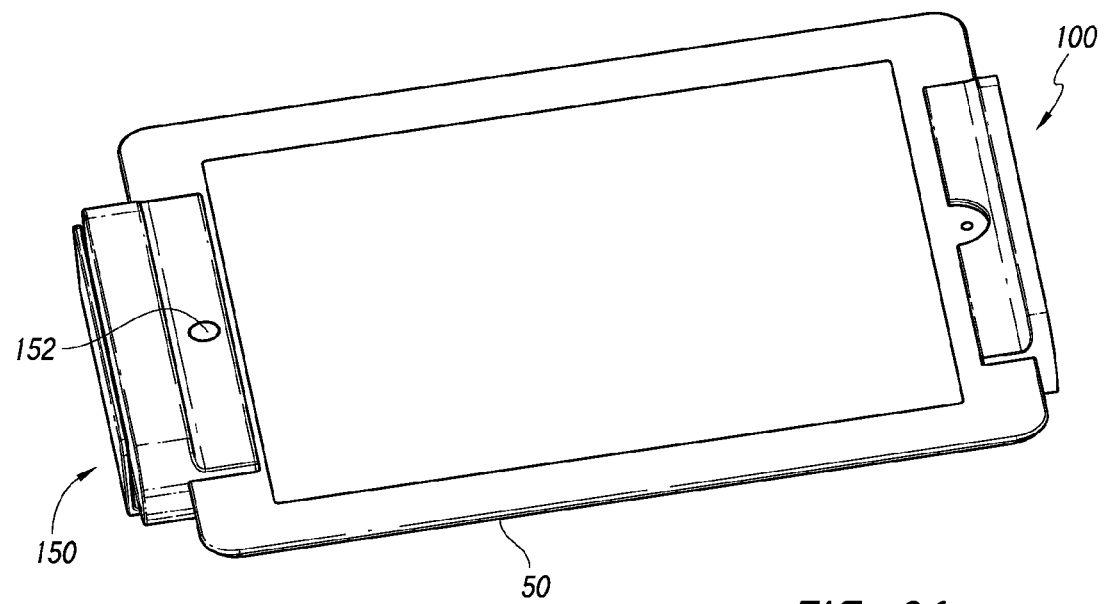
Figure 27:
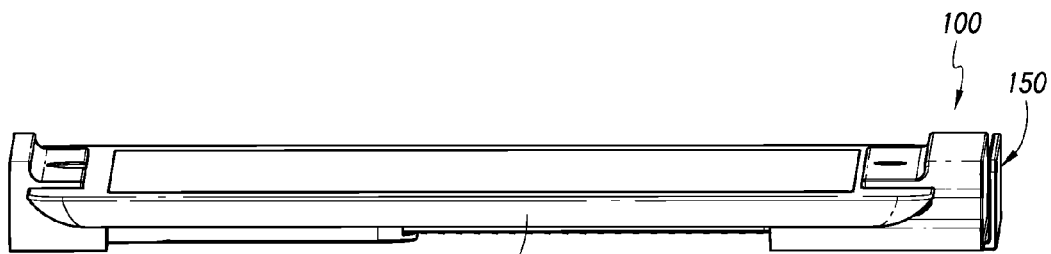
Figure 28:
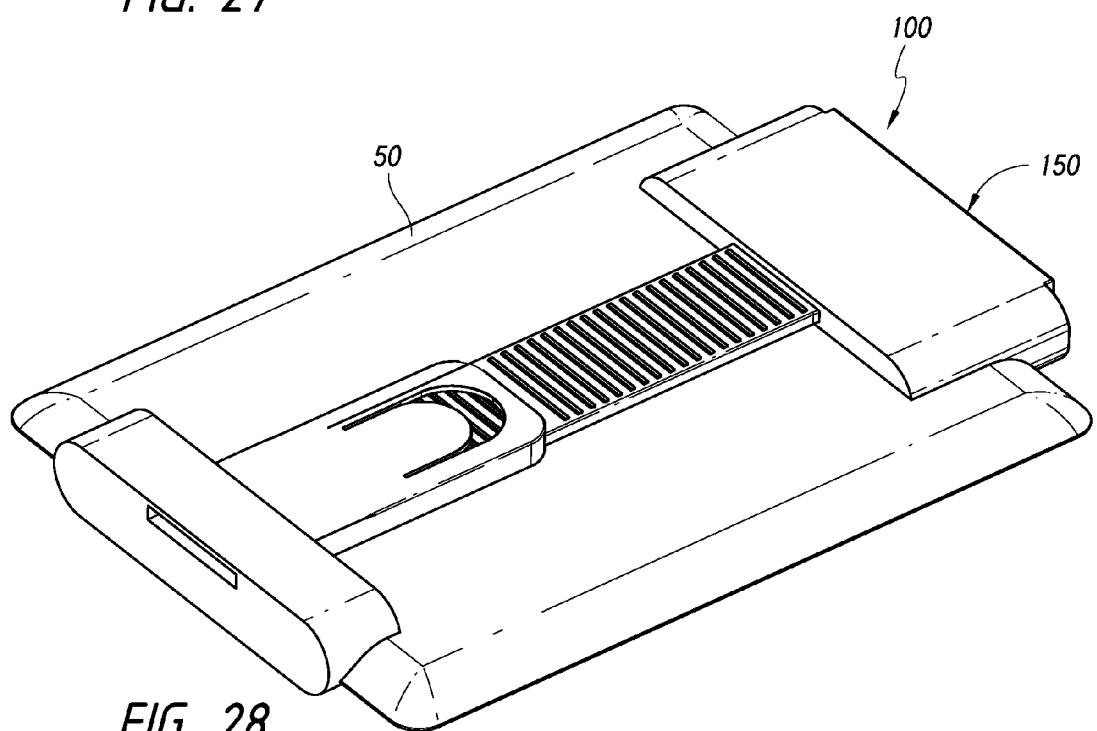
Figure 29:
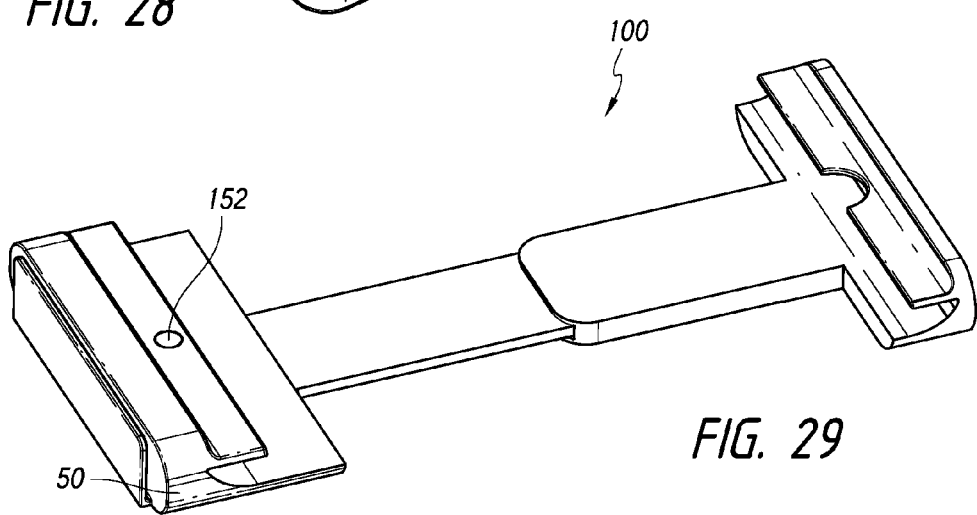
FIG. 29 is a perspective view of the holder of FIGS. 30-33 without the device.
Figure 30:
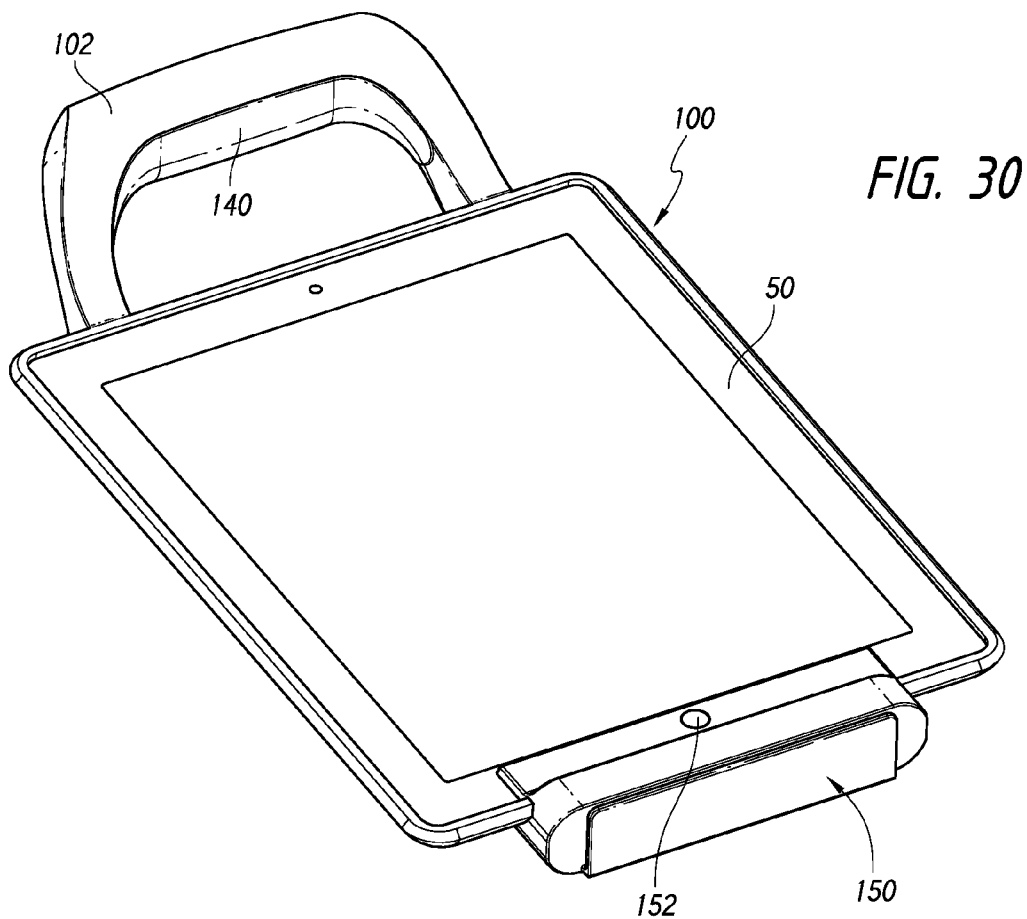
FIGS. 30-34 are various views of a holder and device similar to FIGS. 25-29 except the holder incorporates a handle as in the other holders disclosed herein and the holder is in the form of a case that surrounds all four sides of the device. The holder/case also incorporates a peripheral device.
Figure 31:
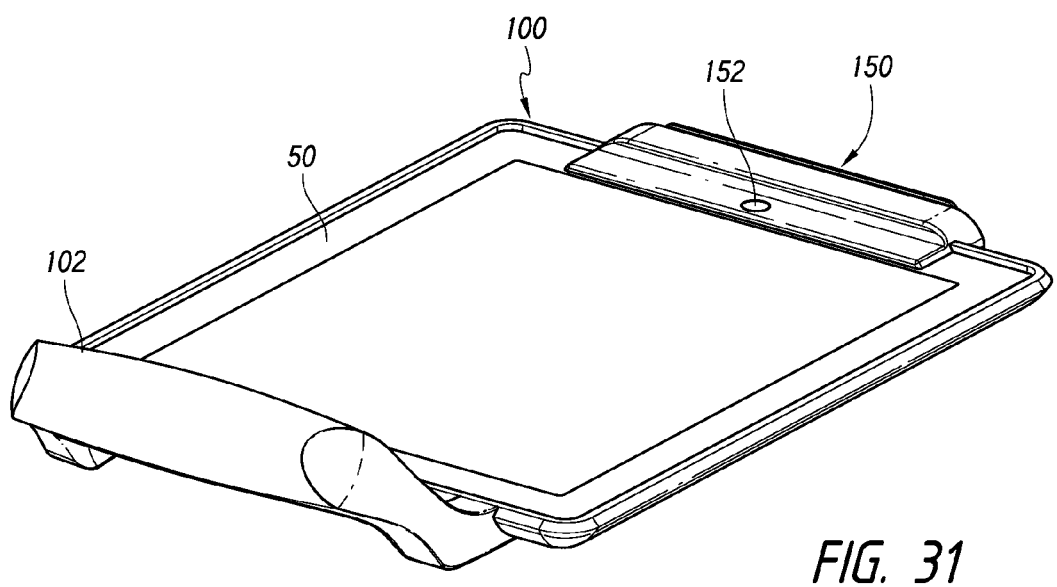
Figure 32:
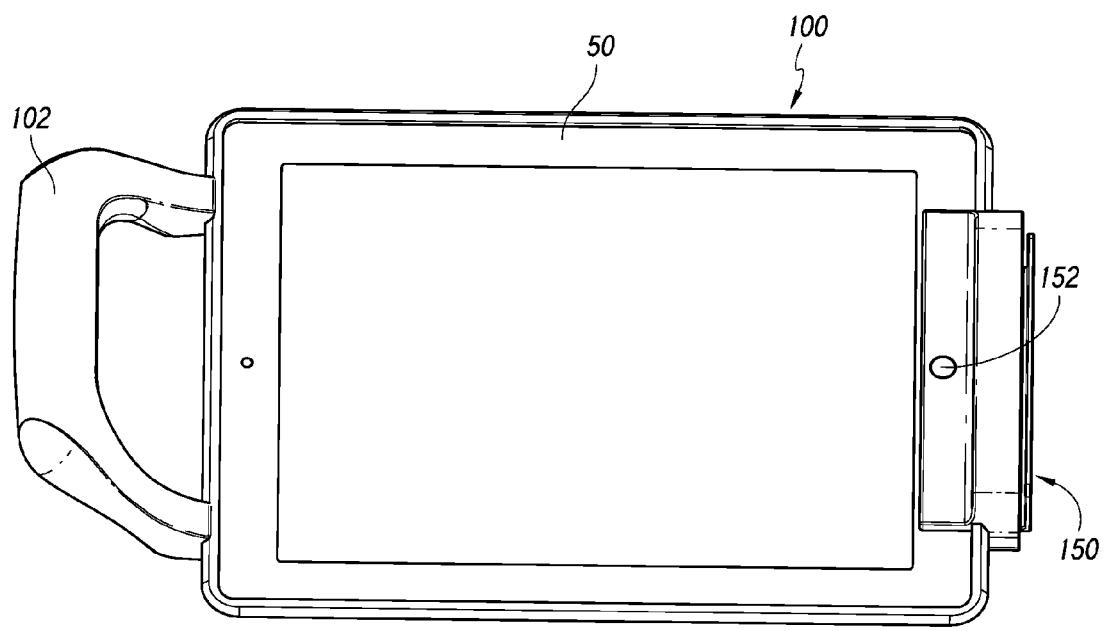
Figure 33:
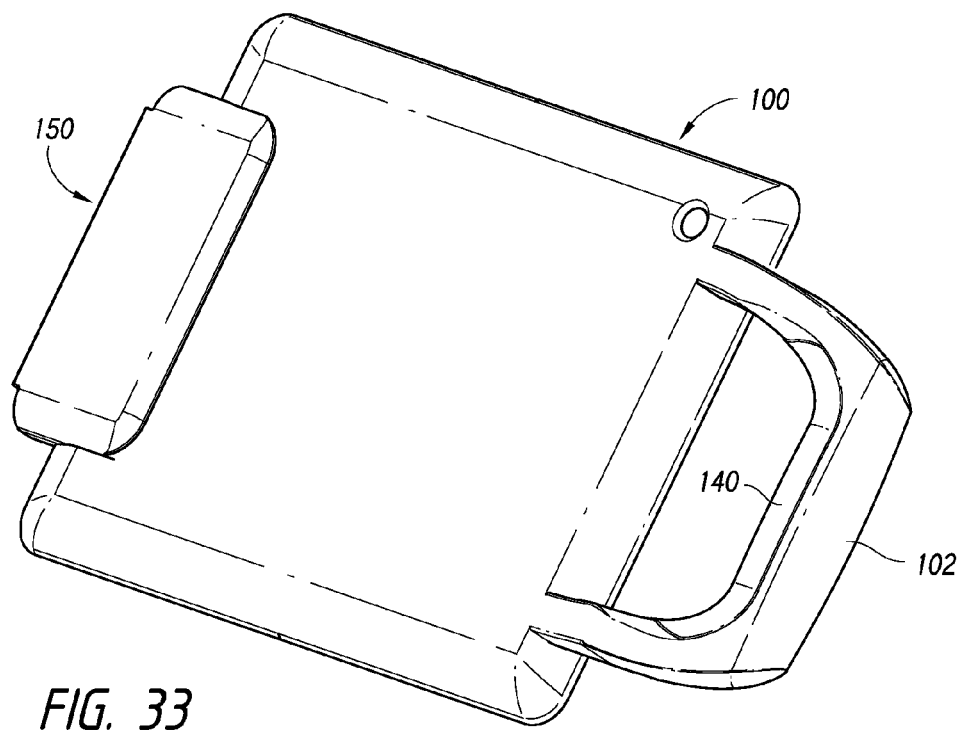
Figure 34:
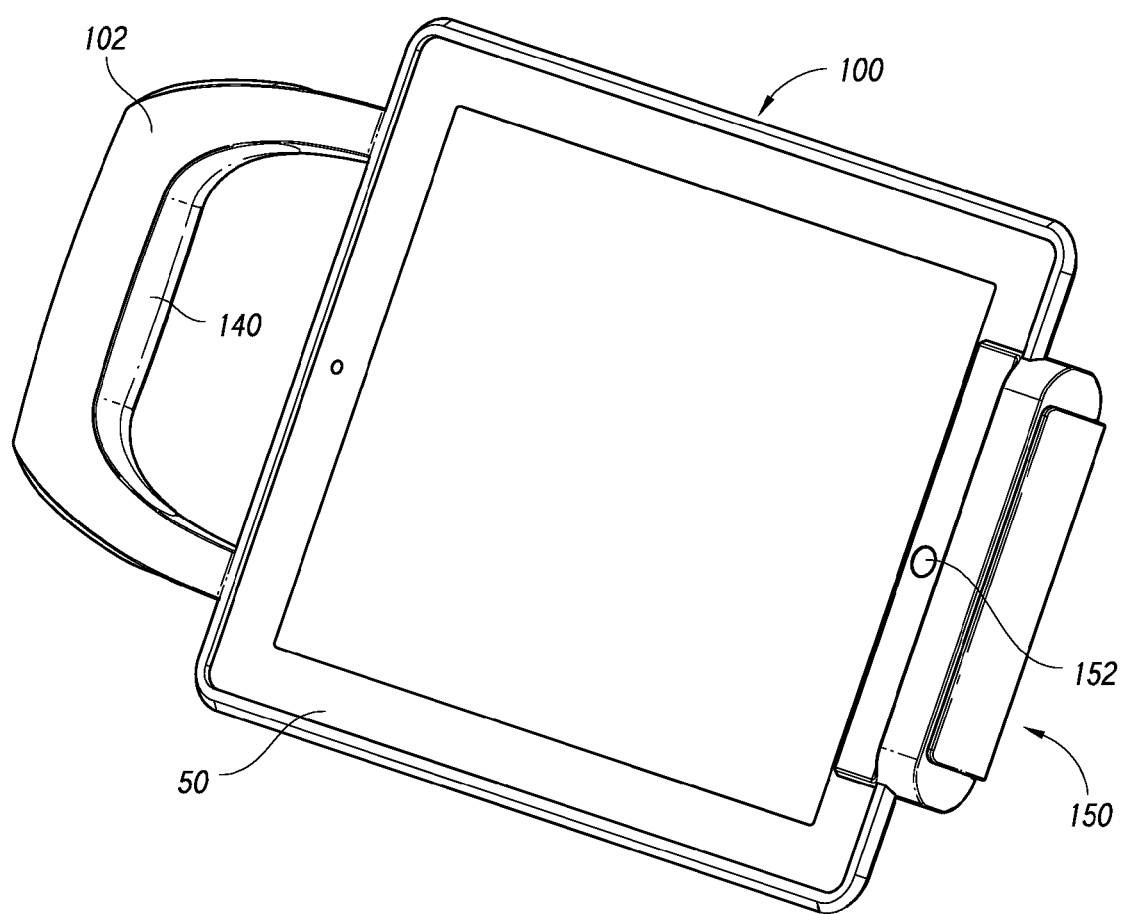
Figure 35:
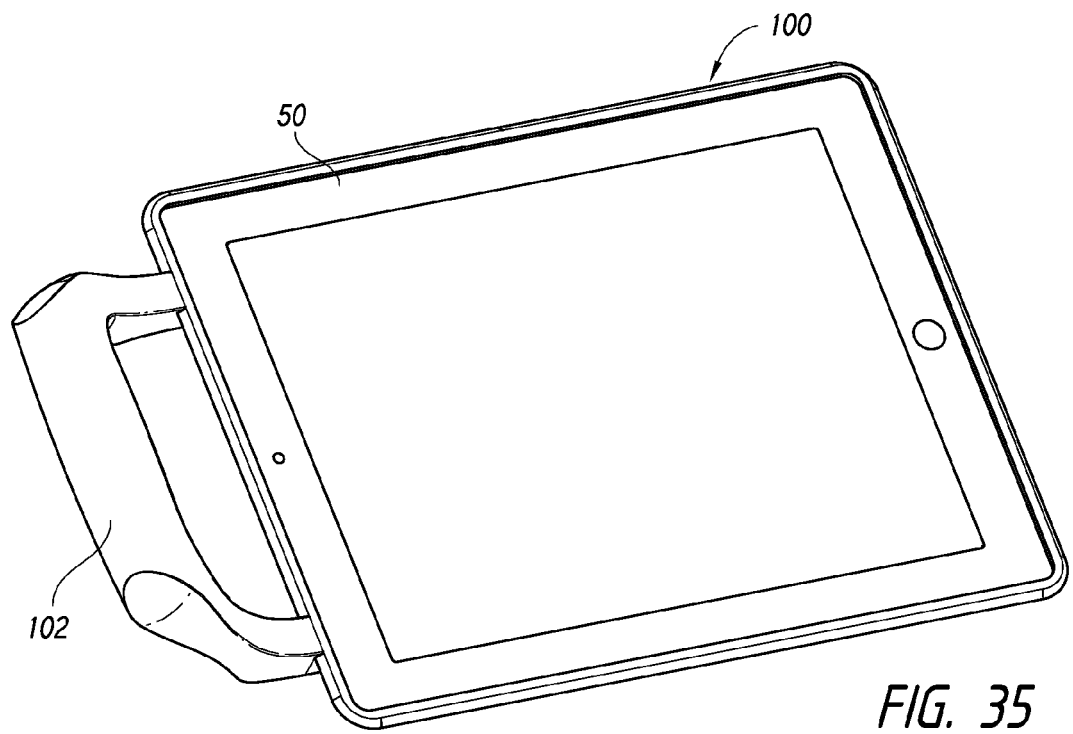
FIGS. 35-39 are various views of a holder and device similar to the other holders disclosed herein except that the holder body is in the form of a case.
Figure 36:
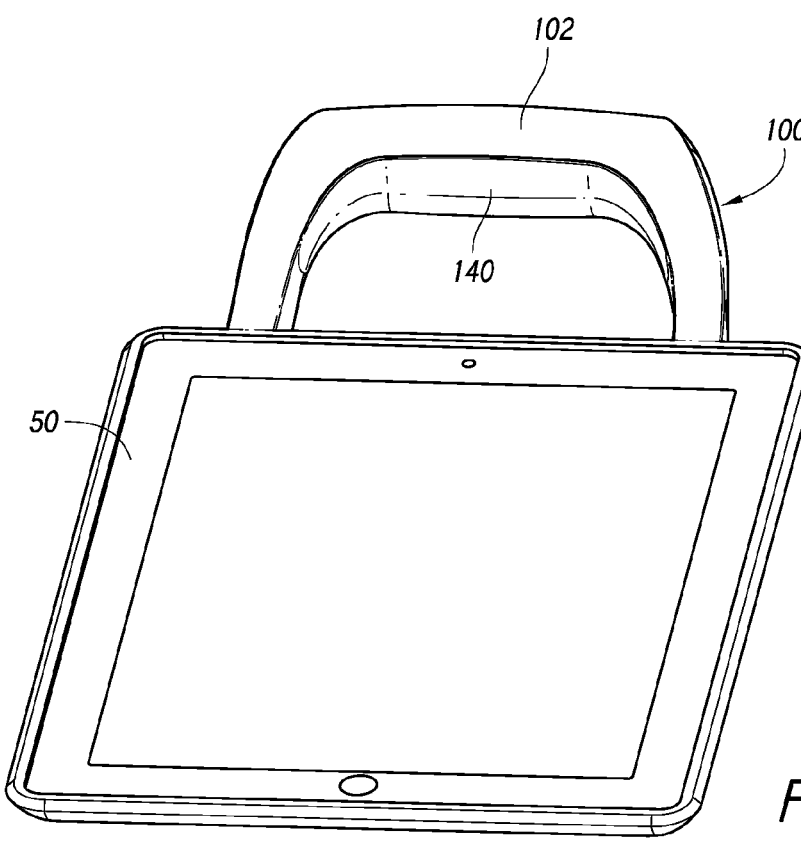
Figure 37:
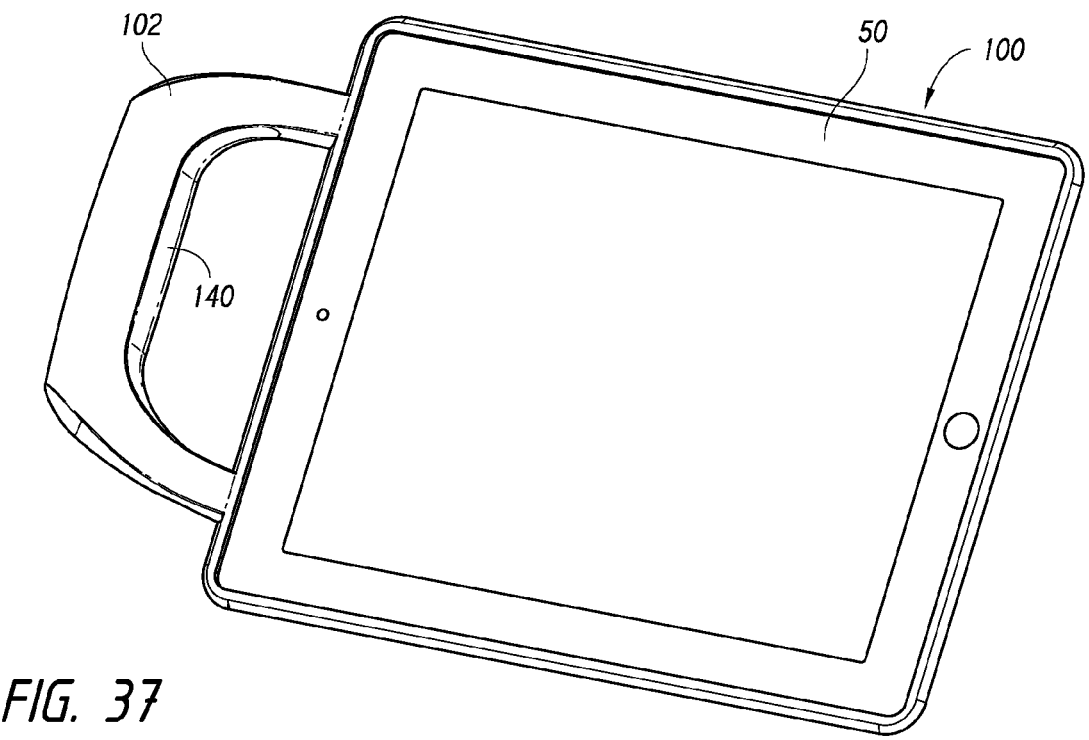
Figure 38:
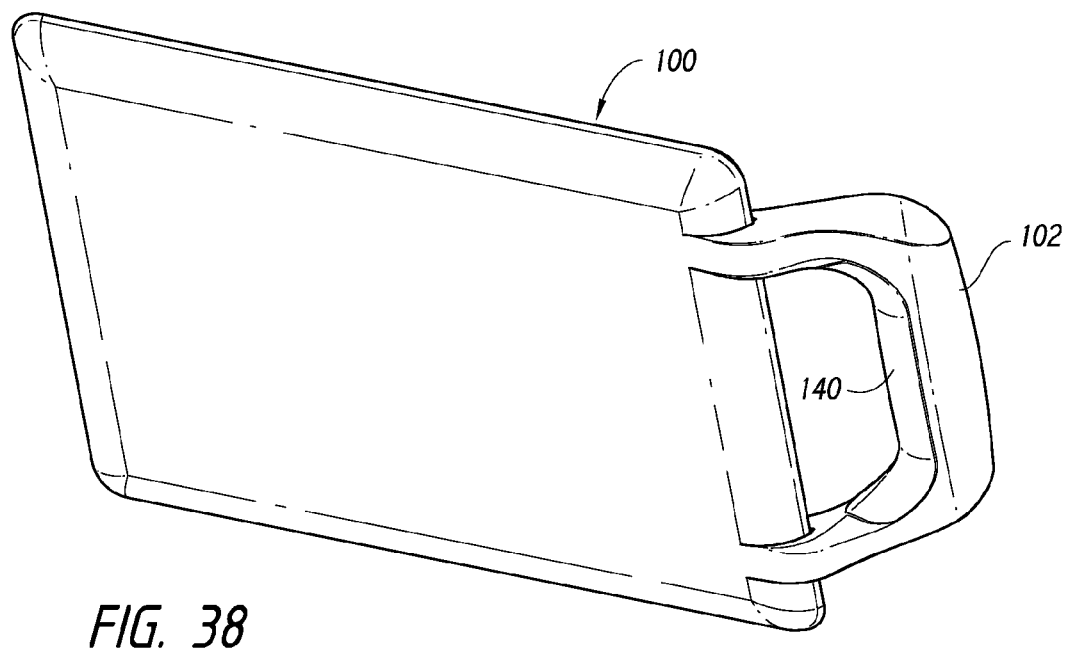
Figure 39:
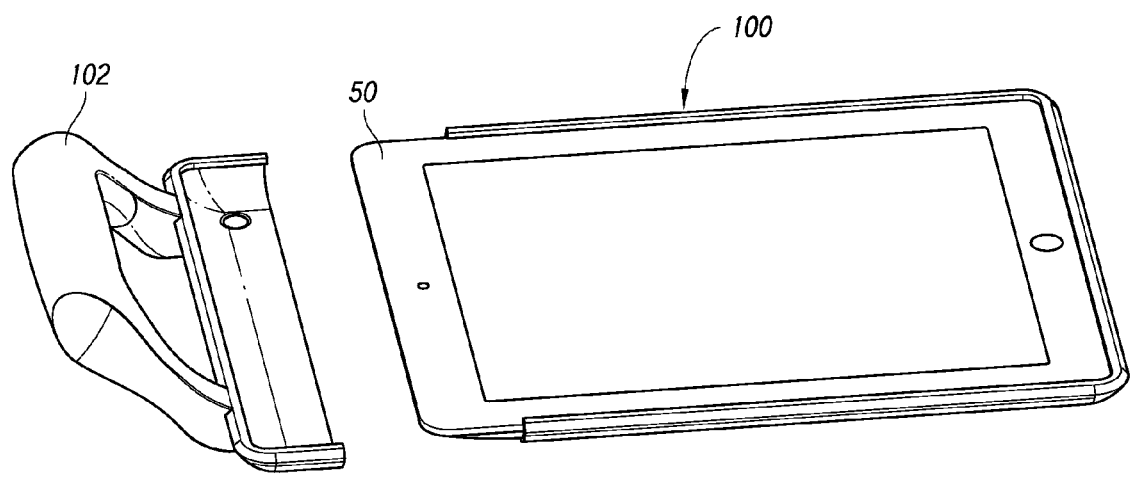

FIGS. 19-24 illustrate different hand positions that can be used with the handle 102 of the holder 100. FIG. 19 is a "coffee-cup grip" with the computer in a portrait orientation. FIG. 20 shows a hand of the user passing through the inside of the handle 102 with the handle 102 resting against the back of the hand to assist in supporting the weight of the device 50 such that the entire weight of the device 50 (and holder 100) is not supported solely by a grip force of the hand of the user. In some configurations, the handle 102 permits a user to hold or support the device 50 (and holder 100) without any grip force by a hand of the user. FIGS. 21 and 22 are similar grips to FIGS. 19 and 20 with the device 50 in a landscape orientation. FIGS. 23 and 24 illustrate a user holding the handle 102 with the holder 100 extending below the hand similar to holding a briefcase, suitcase or bag.

As described above, the holder 100 can include a cut-out that provides access to a port of the device 50. In some arrangements, the holder 100 can be configured to carry or can incorporate a peripheral device 150 that plugs into the port of the device 50. FIGS. 25-29 illustrate a holder 100 that incorporates a peripheral device 150, such as a card reader. However, any other type of peripheral device could be provided. Alternatively, the holder 100 could be configured to receive a peripheral module that can be removed from the holder 100 when not in use. Although shown without a handle, the holder of FIGS. 25-29 could include a handle similar to the handle 102 described above. In addition, other features of the holder of FIGS. 25-29 can be the same as or similar to the features of the holders 100 described above.

The holder 100 of FIGS. 25-29 incorporates an electronic button 152 that permits user input to the input/output port of the device 50. In the illustrated configuration, the electronic button 152 does not physically interact with a control button of the device 50, but only through the port of the device 50. However, in other arrangements, the button 152 could physically interact with a control button of the device 50 and transfer movement from the button 152 to the control button of the device 50. Thus, the button 152 can be located in line with the control button of the device 50 or can be located elsewhere.

As described above, the holder 100 can contact all sides of the device and can also contact the front, the back or both the front and the back of the device. As illustrated in FIGS. 30-39, the holder 100 can be a case or case-like arrangement which can surround a substantial portion of the sides and back of the device and can, but does not necessarily, provide a protective function to the device 50. The holder 100 of FIGS. 30-34 includes a peripheral device, such as a card reader, which can be the same or similar to the arrangement described in connection with FIGS. 25-29. The holder 100 of FIGS. 35-39 omits the peripheral device. The handle 102 can be the same as or similar to any of the handles 102 described herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present holder has been described in the context of particularly preferred embodiments, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Moreover, not all of the features, aspects and advantages are necessarily required to practice the present invention. Thus, it is intended that the scope of the present invention herein disclosed should not be limited by the particular disclosed embodiments described above, but should be determined only by a fair reading of the claims.

What is claimed is:

1. A holder for a mobile computing device, comprising:
a body having a first contact surface and a second contact surface, wherein the body is configured such that each of the first and second contact surfaces contacts a respective one of opposing side surfaces of the mobile computing device to removably mount the holder to the mobile computing device, wherein the holder is configured to hold the mobile computing device within a planar device space of the holder that extends between the first contact surface and the second contact surface;
a handle extending from the body, wherein the handle has a handgrip portion that is spaced laterally from the device space when the holder is viewed normal to the device space such that the handgrip portion is positioned on an opposite side of the first contact surface from the second contact surface and the handgrip portion does not overlap the device space;
wherein the body comprises a first portion, a second portion and a coupling arrangement that couples the first body portion and the second body portion in either one of a first position and a second position, wherein the first body portion defines the first contact surface and the second body portion defines the second contact surface, and wherein the holder defines a first dimension between the first contact surface and the second contact surface in the first position and a second dimension between the first contact surface and the second contact surface in the second position, and wherein the first dimension is different from the second position;
wherein the handle comprises a pair of side supports that extend from opposing ends of the handgrip portion and define a space between them that is configured to accommodate a hand of a user of the holder.

2. The holder of claim 1, wherein an axis of the handgrip portion defines an angle with a plane of the device space.

3. The holder of claim 2, wherein the handle is adjustable between at least a first angled position, a second stowed position and a third stand position.

4. The holder of claim 1, wherein the mobile computing device is a tablet computer and the body is sized and shaped to accommodate the tablet computer.

5. A holder for a mobile computing device, comprising:
a first body portion having a first contact surface;
a second body portion having a second contact surface;
a handle coupled to one of the first and second body portions;
a coupling arrangement that couples the first body portion and the second body portion in either one of a first position and a second position, wherein the first contact surface and the second contact surface face one another and define a device space therebetween that receives the mobile computing device;
wherein the handle has a handgrip portion that is positioned on an opposite side of the first contact surface from the second contact surface such that the handgrip portion does not overlap the mobile computing device when the holder is viewed normal to the device space;
wherein the holder defines a first dimension between the first contact surface and the second contact surface in the first position and a second dimension between the first contact surface and the second contact surface in the second position, and wherein the first dimension is different from the second position;
wherein the coupling arrangement comprises complementary interlocking surface features on the first and second body portions, wherein the interlocking surface features are configured to engage one another to secure the first and second body portions in at least the first position and the second position; and
wherein the handle comprises a pair of side supports that extend from opposing ends of the handgrip portion and define a space between them that is configured to accommodate a hand of a user of the holder.

6. The holder of claim 5, wherein the coupling arrangement comprises an elongate tongue carried by one of the first and second body portions and a lock arm carried by the other of the first and second body portions, wherein the elongate tongue and the lock arm comprise the interlocking surface features that permit the lock arm to secure the elongate tongue in at least the first position and the second position.

7. The holder of claim 6, wherein the coupling arrangement permits the first and second body portions to be coupled in one or more positions in addition to the first and second positions.

8. The holder of claim 7, wherein the elongate tongue defines a plurality of teeth on any combination of a back surface, first side surface and second side surface.

9. The holder of claim 5, wherein the handle is unitarily formed with the first body portion.

10. The holder of claim 5, wherein the first body portion further comprises a pair of hook portions configured to grasp the mobile computing device, wherein each of the hook portions extend from one of the side supports of the handle.

11. The holder of claim 10, wherein the second body portion comprises a pair of hook portions configured to grasp the mobile computing device.

12. The holder of claim 1, wherein the handle is unitarily formed with the first body portion.

13. The holder of claim 1, wherein the first body portion further comprises a pair of hook portions configured to grasp the mobile computing device, wherein each of the hook portions extend from one of the side supports of the handle.

14. The holder of claim 13, wherein the second body portion comprises a pair of hook portions configured to grasp the mobile computing device.

\* \* \* \* \*